(12) United States Patent
Ritchey et al.

(10) Patent No.: US 12,176,836 B2
(45) Date of Patent: Dec. 24, 2024

(54) SYSTEMS AND METHODS FOR INTELLIGENT ENERGY STORAGE AND PROVISIONING USING AN ENERGY STORAGE CONTROL SYSTEM

(71) Applicant: DPM TECHNOLOGIES INC., Calgary (CA)

(72) Inventors: Jonathan Gale Ritchey, Kelowna (CA); Kent Thoresen, Hokksund (NO)

(73) Assignee: DPM TECHNOLOGIES INC., Calgary (CA)

( * ) Notice: Subject to any disclaimer, the term of this patent is extended or adjusted under 35 U.S.C. 154(b) by 800 days.

(21) Appl. No.: 17/274,036

(22) PCT Filed: Sep. 4, 2019

(86) PCT No.: PCT/CA2019/051238
§ 371 (c)(1),
(2) Date: Mar. 5, 2021

(87) PCT Pub. No.: WO2020/047663
PCT Pub. Date: Mar. 12, 2020

(65) Prior Publication Data
US 2021/0359523 A1     Nov. 18, 2021

(51) Int. Cl.
*H02P 25/18*     (2006.01)
*H02J 3/32*     (2006.01)
(Continued)

(52) U.S. Cl.
CPC ............... *H02P 25/18* (2013.01); *H02J 3/32* (2013.01); *H02J 3/381* (2013.01); *H02J 3/46* (2013.01);
(Continued)

(58) Field of Classification Search
CPC ......... H02P 25/18; H02K 11/26; H02K 11/28; H02J 3/32; H02J 3/381; H02J 3/46;
(Continued)

(56) References Cited

U.S. PATENT DOCUMENTS 757,394 A     4/1904     Eickemeyer et al.
908,097 A     12/1908     Herz
(Continued)

FOREIGN PATENT DOCUMENTS

AU     2018101036 A4     10/2018
BR     PI0415663 A     12/2006
(Continued)

OTHER PUBLICATIONS

International Search Report and Written Opinion mailed Jul. 12, 2022 in PCT/CA2022/050620, 15 pages.
(Continued)

*Primary Examiner* — Suresh Memula
(74) *Attorney, Agent, or Firm* — Cozen O'Connor

(57) ABSTRACT

Control of an energy storage and provisioning system is disclosed, including a method in which electrical power is received from a power generator in an energy storage system having energy storage cells. Each of the energy storage cells has switching elements selectively operable to connect with terminals of other energy storage cells. The method further includes determining a condition of a number of the energy storage cells via electrical measurement; and grouping, by controlling operation of the switching elements, a subset of the energy storage cells into a topology configuration based on a condition of individual cells of the subset of energy storage cells. The method further includes storing the received electrical power into the subset of energy storage
(Continued)

cells arranged into the topology configuration to optimize storage of the electrical power received from the power generator.

19 Claims, 6 Drawing Sheets

(51) Int. Cl.
| | |
|---|---|
| H02J 3/38 | (2006.01) |
| H02J 3/46 | (2006.01) |
| H02J 7/00 | (2006.01) |
| H02J 7/14 | (2006.01) |
| H02K 11/26 | (2016.01) |
| H02K 11/28 | (2016.01) |
| H02M 7/66 | (2006.01) |

(52) U.S. Cl.
CPC .......... *H02J 7/0014* (2013.01); *H02J 7/0024* (2013.01); *H02J 7/1415* (2013.01); *H02K 11/26* (2016.01); *H02K 11/28* (2016.01); *H02M 7/66* (2013.01)

(58) Field of Classification Search
CPC ...... H02J 7/0014; H02J 7/0024; H02J 7/1415; H02M 7/66
USPC .......................................................... 320/118
See application file for complete search history.

(56) References Cited

U.S. PATENT DOCUMENTS

| | | | |
|---|---|---|---|
| 1,980,808 A | 11/1934 | Leibing |
| 2,091,190 A | 8/1937 | Tullio |
| 2,189,524 A | 2/1940 | Randolph et al. |
| 2,333,575 A | 11/1943 | Kilgore et al. |
| 2,407,883 A | 9/1946 | Corwill |
| 2,430,886 A | 11/1947 | Glen |
| 2,432,117 A | 12/1947 | Morton |
| 2,488,729 A | 11/1949 | Kooyman |
| 2,504,681 A | 4/1950 | Hall |
| 2,516,114 A | 7/1950 | Green |
| 2,601,517 A | 6/1952 | Hammes |
| 2,680,822 A | 6/1954 | Brainard |
| 2,719,931 A | 10/1955 | William |
| 3,083,311 A | 3/1963 | Shelley |
| 3,149,256 A | 9/1964 | Walter |
| 3,153,157 A | 10/1964 | Erich |
| 3,169,203 A | 2/1965 | Lavin et al. |
| 3,223,865 A | 12/1965 | Lewis |
| 3,237,034 A | 2/1966 | Shelley |
| 3,293,470 A | 12/1966 | Richard |
| 3,411,027 A | 11/1968 | Heinz |
| 3,482,156 A | 12/1969 | Porath |
| 3,549,925 A | 12/1970 | Johnson |
| 3,621,370 A | 11/1971 | Vandervort |
| 3,713,015 A | 1/1973 | Frister |
| 3,801,844 A | 4/1974 | Steele |
| 3,809,936 A | 5/1974 | Klein |
| 3,870,928 A | 3/1975 | Allen |
| 3,903,863 A | 9/1975 | Katsumata |
| 3,942,913 A | 3/1976 | Bokelman |
| 3,944,855 A | 3/1976 | Le |
| 3,965,669 A | 6/1976 | Larson et al. |
| 3,973,137 A | 8/1976 | Drobina |
| 3,973,501 A | 8/1976 | Briggs |
| 3,984,750 A | 10/1976 | Pfeffer et al. |
| 3,992,641 A | 11/1976 | Heinrich et al. |
| 4,001,887 A | 1/1977 | Platt et al. |
| 4,004,426 A | 1/1977 | Laing |
| 4,013,937 A | 3/1977 | Pelly et al. |
| 4,015,174 A | 3/1977 | Cotton |
| 4,020,369 A | 4/1977 | Shoupp et al. |
| 4,023,751 A | 5/1977 | Richard |
| 4,035,701 A | 7/1977 | Jensen |
| 4,039,848 A | 8/1977 | Winderl |
| 4,050,295 A | 9/1977 | Harvey |
| 4,051,402 A | 9/1977 | Gruber |
| 4,074,159 A | 2/1978 | Robison |
| 4,074,180 A | 2/1978 | Sharpe et al. |
| 4,081,726 A | 3/1978 | Brimer et al. |
| 4,095,922 A | 6/1978 | Farr |
| 4,100,743 A | 7/1978 | Trumbull et al. |
| 4,107,987 A | 8/1978 | Robbins et al. |
| 4,126,933 A | 11/1978 | Anderson et al. |
| 4,141,331 A | 2/1979 | Mallory |
| 4,142,696 A | 3/1979 | Nottingham |
| 4,142,969 A | 3/1979 | Funk et al. |
| 4,151,051 A | 4/1979 | Evans |
| 4,155,252 A | 5/1979 | Morrill |
| 4,159,496 A | 6/1979 | Stevens |
| 4,167,692 A | 9/1979 | Sekiya et al. |
| 4,168,459 A | 9/1979 | Roesel |
| 4,179,633 A | 12/1979 | Kelly |
| 4,181,468 A | 1/1980 | Kent et al. |
| 4,187,441 A | 2/1980 | Oney |
| 4,191,893 A | 3/1980 | Grana et al. |
| 4,196,572 A | 4/1980 | Hunt |
| 4,203,710 A | 5/1980 | Farr |
| 4,211,945 A | 7/1980 | Tawse |
| 4,215,426 A | 7/1980 | Klatt |
| 4,237,391 A | 12/1980 | Schur et al. |
| 4,245,601 A | 1/1981 | Crowder |
| 4,246,490 A | 1/1981 | Keramati et al. |
| 4,247,785 A | 1/1981 | Apgar |
| 4,253,031 A | 2/1981 | Frister |
| 4,254,344 A | 3/1981 | Fancy et al. |
| 4,260,901 A | 4/1981 | Woodbridge |
| 4,261,312 A | 4/1981 | Hart |
| 4,261,562 A | 4/1981 | Flavell |
| 4,276,481 A | 6/1981 | Parker |
| 4,286,581 A | 9/1981 | Atkinson |
| 4,289,970 A | 9/1981 | Deibert |
| 4,291,235 A | 9/1981 | Bergey et al. |
| 4,297,604 A | 10/1981 | Tawse |
| 4,302,683 A | 11/1981 | Burton |
| 4,305,031 A | 12/1981 | Wharton |
| 4,308,479 A | 12/1981 | Richter |
| 4,313,080 A | 1/1982 | Park |
| 4,316,096 A | 2/1982 | Syverson |
| 4,317,437 A | 3/1982 | Lindgren |
| 4,322,667 A | 3/1982 | Ohba |
| 4,325,429 A | 4/1982 | Bevan et al. |
| 4,329,138 A | 5/1982 | Riordan |
| 4,338,557 A | 7/1982 | Wanlass |
| 4,339,704 A | 7/1982 | McSparran et al. |
| 4,340,822 A | 7/1982 | Gregg |
| 4,355,276 A | 10/1982 | Vittay |
| 4,358,693 A | 11/1982 | Palmer et al. |
| 4,364,005 A | 12/1982 | Kohzai et al. |
| 4,373,488 A | 2/1983 | Neuhalfen |
| 4,385,246 A | 5/1983 | Schur et al. |
| 4,389,691 A | 6/1983 | Hancock |
| 4,394,720 A | 7/1983 | Gabor |
| 4,402,524 A | 9/1983 | D'Antonio et al. |
| 4,406,950 A | 9/1983 | Roesel |
| 4,412,170 A | 10/1983 | Roesel |
| 4,419,617 A | 12/1983 | Reitz |
| 4,433,280 A | 2/1984 | Lindgren |
| 4,433,355 A | 2/1984 | Chew et al. |
| 4,434,389 A | 2/1984 | Langley et al. |
| 4,434,617 A | 3/1984 | Walsh |
| 4,444,444 A | 4/1984 | Benedetti et al. |
| 4,446,377 A | 5/1984 | Kure-Jensen et al. |
| 4,454,865 A | 6/1984 | Tammen |
| 4,456,858 A | 6/1984 | Loven |
| 4,458,489 A | 7/1984 | Walsh |
| 4,459,536 A | 7/1984 | Wirtz |
| 4,473,751 A | 9/1984 | Rombach et al. |
| 4,477,745 A | 10/1984 | Lux |
| 4,503,368 A | 3/1985 | Sakamoto |
| 4,511,805 A | 4/1985 | Boy-Marcotte et al. |
| 4,513,576 A | 4/1985 | Dibrell et al. |

(56) References Cited

U.S. PATENT DOCUMENTS

| | | |
|---|---|---|
| RE31,947 E | 7/1985 | Farr |
| 4,532,431 A | 7/1985 | Iliev et al. |
| 4,532,460 A | 7/1985 | Gale et al. |
| 4,535,263 A | 8/1985 | Avery |
| 4,536,668 A | 8/1985 | Boyer |
| 4,536,672 A | 8/1985 | Kanayama et al. |
| 4,539,485 A | 9/1985 | Neuenschwander |
| 4,549,121 A | 10/1985 | Gale |
| 4,562,398 A | 12/1985 | Kotlarewsky |
| 4,575,671 A | 3/1986 | Lee et al. |
| 4,578,609 A | 3/1986 | McCarty |
| 4,581,999 A | 4/1986 | Campagnuolo et al. |
| 4,591,746 A | 5/1986 | Kamiyama |
| 4,593,289 A | 6/1986 | Newcomb |
| 4,598,240 A | 7/1986 | Gale et al. |
| 4,599,551 A | 7/1986 | Wheatley et al. |
| 4,601,354 A | 7/1986 | Campbell et al. |
| 4,605,874 A | 8/1986 | Whiteley |
| 4,628,219 A | 12/1986 | Troscinski |
| 4,630,817 A | 12/1986 | Buckley |
| 4,638,224 A | 1/1987 | Gritter |
| 4,639,647 A | 1/1987 | Posma |
| 4,641,080 A | 2/1987 | Glennon et al. |
| 4,642,031 A | 2/1987 | Farr |
| 4,642,988 A | 2/1987 | Benson |
| 4,644,233 A | 2/1987 | Suzuki |
| 4,654,066 A | 3/1987 | Garcia et al. |
| 4,654,537 A | 3/1987 | Gaspard |
| 4,656,379 A | 4/1987 | McCarty |
| 4,658,166 A | 4/1987 | Oudet |
| 4,658,346 A | 4/1987 | Templeton |
| 4,664,685 A | 5/1987 | Young |
| 4,668,885 A | 5/1987 | Scheller |
| 4,674,199 A | 6/1987 | Lakic |
| 4,675,591 A | 6/1987 | Pleiss |
| 4,678,954 A | 7/1987 | Takeda et al. |
| 4,682,067 A | 7/1987 | Oudet |
| 4,684,872 A | 8/1987 | Stewart |
| 4,687,945 A | 8/1987 | Ebeling |
| 4,692,675 A | 9/1987 | Falk |
| 4,698,538 A | 10/1987 | Yoshida |
| 4,698,562 A | 10/1987 | Gale et al. |
| 4,710,667 A | 12/1987 | Whiteley |
| 4,713,569 A | 12/1987 | Schwartz |
| 4,729,218 A | 3/1988 | Haselbauer et al. |
| 4,737,070 A | 4/1988 | Horiuchi et al. |
| 4,739,203 A | 4/1988 | Miyao et al. |
| 4,772,842 A | 9/1988 | Ghosh |
| 4,779,038 A | 10/1988 | Eckerfeld |
| 4,783,028 A | 11/1988 | Olson |
| 4,783,038 A | 11/1988 | Gilbert et al. |
| 4,785,228 A | 11/1988 | Goddard |
| 4,806,812 A | 2/1989 | Masterman |
| 4,809,510 A | 3/1989 | Gaspard et al. |
| 4,811,091 A | 3/1989 | Morrison et al. |
| 4,814,651 A | 3/1989 | Elris et al. |
| 4,819,361 A | 4/1989 | Boharski |
| 4,831,300 A | 5/1989 | Lindgren |
| 4,835,433 A | 5/1989 | Brown |
| 4,843,270 A | 6/1989 | Dijken |
| 4,845,749 A | 7/1989 | Brickell et al. |
| 4,851,703 A | 7/1989 | Means |
| 4,862,021 A | 8/1989 | LaRocca |
| 4,864,151 A | 9/1989 | Wyczalek et al. |
| 4,866,321 A | 9/1989 | Blanchard et al. |
| 4,872,805 A | 10/1989 | Horiuchi et al. |
| 4,874,346 A | 10/1989 | Wachspress |
| 4,876,991 A | 10/1989 | Galitello |
| 4,879,045 A | 11/1989 | Eggerichs |
| 4,879,484 A | 11/1989 | Huss |
| 4,879,501 A | 11/1989 | Haner |
| 4,884,953 A | 12/1989 | Golben |
| 4,885,526 A | 12/1989 | Szabo |
| 4,890,049 A | 12/1989 | Auinger |
| 4,893,040 A | 1/1990 | Turner et al. |
| 4,904,926 A | 2/1990 | Pasichinskyj |
| 4,906,877 A | 3/1990 | Ciaio |
| 4,914,412 A | 4/1990 | Engdahl et al. |
| 4,927,329 A | 5/1990 | Kliman et al. |
| 4,933,609 A | 6/1990 | Clark |
| 4,948,044 A | 8/1990 | Cacciatore |
| 4,950,973 A | 8/1990 | Kouba |
| 4,953,052 A | 8/1990 | Cartlidge et al. |
| 4,959,605 A | 9/1990 | Vaidya et al. |
| 4,963,780 A | 10/1990 | Hochstrasser |
| 4,973,868 A | 11/1990 | Wust |
| 4,977,529 A | 12/1990 | Gregg et al. |
| 4,980,595 A | 12/1990 | Arora |
| 4,985,875 A | 1/1991 | Mitchell |
| 4,994,700 A | 2/1991 | Arora |
| 5,002,020 A | 3/1991 | Kos |
| 5,003,209 A | 3/1991 | Huss et al. |
| 5,003,517 A | 3/1991 | Greer |
| 5,021,698 A | 6/1991 | Pullen et al. |
| 5,030,867 A | 7/1991 | Yamada et al. |
| 5,043,592 A | 8/1991 | Hochstrasser |
| 5,043,911 A | 8/1991 | Rashid |
| 5,047,680 A | 9/1991 | Toeroek |
| 5,053,662 A | 10/1991 | Richter |
| 5,053,732 A | 10/1991 | Elgass et al. |
| 5,057,726 A | 10/1991 | Mole et al. |
| 5,057,731 A | 10/1991 | Hancock |
| 5,058,833 A | 10/1991 | Carmouche |
| 5,065,305 A | 11/1991 | Rich |
| 5,072,145 A | 12/1991 | Davis et al. |
| 5,117,142 A | 5/1992 | Von |
| 5,120,332 A | 6/1992 | Wells |
| 5,130,595 A | 7/1992 | Arora |
| 5,146,146 A | 9/1992 | Saemann |
| 5,155,375 A | 10/1992 | Holley |
| 5,164,826 A | 11/1992 | Dailey |
| 5,174,109 A | 12/1992 | Lampe |
| 5,184,040 A | 2/1993 | Lim |
| 5,184,458 A | 2/1993 | Lampe et al. |
| 5,191,256 A | 3/1993 | Reiter et al. |
| 5,208,498 A | 5/1993 | Hamajima |
| 5,220,223 A | 6/1993 | Mehnert |
| 5,220,232 A | 6/1993 | Rigney et al. |
| 5,225,712 A | 7/1993 | Erdman |
| 5,227,702 A | 7/1993 | Nahirney |
| 5,237,815 A | 8/1993 | Mcarthur |
| 5,237,817 A | 8/1993 | Bornemisza et al. |
| 5,258,697 A | 11/1993 | Ford et al. |
| 5,267,129 A | 11/1993 | Anderson et al. |
| 5,270,635 A | 12/1993 | Hoffman et al. |
| 5,281,094 A | 1/1994 | McCarty et al. |
| 5,283,488 A | 2/1994 | Ponnappan et al. |
| 5,289,041 A | 2/1994 | Holley |
| 5,289,072 A | 2/1994 | Lange |
| 5,306,972 A | 4/1994 | Hokanson et al. |
| 5,317,498 A | 5/1994 | Dhyandchand et al. |
| 5,336,933 A | 8/1994 | Ernster |
| 5,346,370 A | 9/1994 | Krohn |
| 5,355,044 A | 10/1994 | Uchida et al. |
| 5,369,324 A | 11/1994 | Saether |
| 5,370,112 A | 12/1994 | Perkins |
| 5,371,426 A | 12/1994 | Nagate et al. |
| 5,397,922 A | 3/1995 | Paul et al. |
| 5,400,596 A | 3/1995 | Shlien |
| 5,406,186 A | 4/1995 | Fair |
| 5,409,435 A | 4/1995 | Daniels |
| 5,413,010 A | 5/1995 | Sakakibara et al. |
| 5,418,436 A | 5/1995 | Apuzzo |
| 5,427,194 A | 6/1995 | Miller |
| 5,433,175 A | 7/1995 | Hughes et al. |
| 5,448,123 A | 9/1995 | Nilson et al. |
| 5,468,378 A | 11/1995 | De |
| 5,469,045 A | 11/1995 | Dove et al. |
| 5,473,205 A | 12/1995 | Haaland |
| 5,481,146 A | 1/1996 | Davey |
| 5,484,120 A | 1/1996 | Blakeley et al. |
| 5,489,290 A | 2/1996 | Furnish |
| 5,489,810 A | 2/1996 | Ferreira et al. |
| 5,496,238 A | 3/1996 | Taylor |

(56) References Cited

U.S. PATENT DOCUMENTS

| | | | |
|---|---|---|---|
| 5,504,382 A | 4/1996 | Douglass et al. |
| 5,512,811 A | 4/1996 | Latos et al. |
| 5,517,822 A | 5/1996 | Haws et al. |
| 5,523,635 A | 6/1996 | Ferreira et al. |
| 5,523,637 A | 6/1996 | Miller |
| 5,530,307 A | 6/1996 | Horst |
| 5,568,005 A | 10/1996 | Davidson |
| 5,594,289 A | 1/1997 | Minato |
| 5,610,448 A | 3/1997 | Dattilo |
| 5,614,773 A | 3/1997 | Fabris |
| 5,619,423 A | 4/1997 | Scrantz |
| 5,625,241 A | 4/1997 | Ewing et al. |
| 5,625,276 A | 4/1997 | Scott et al. |
| 5,626,103 A | 5/1997 | Haws et al. |
| 5,637,934 A | 6/1997 | Fabris |
| 5,637,935 A | 6/1997 | Haaland |
| 5,641,276 A | 6/1997 | Heidelberg et al. |
| 5,650,679 A | 7/1997 | Boggs et al. |
| 5,653,135 A | 8/1997 | Miller et al. |
| 5,656,915 A | 8/1997 | Eaves |
| 5,659,300 A | 8/1997 | Dresselhuys et al. |
| 5,670,861 A | 9/1997 | Nor |
| 5,682,073 A | 10/1997 | Mizuno |
| 5,689,165 A | 11/1997 | Jones et al. |
| 5,689,175 A | 11/1997 | Hanson et al. |
| 5,690,209 A | 11/1997 | Kofoed |
| 5,696,413 A | 12/1997 | Woodbridge et al. |
| 5,696,419 A | 12/1997 | Rakestraw et al. |
| 5,699,218 A | 12/1997 | Kadah |
| 5,708,314 A | 1/1998 | Law |
| 5,709,103 A | 1/1998 | Williams |
| 5,710,474 A | 1/1998 | Mulgrave |
| 5,715,716 A | 2/1998 | Miller et al. |
| 5,717,316 A | 2/1998 | Kawai |
| 5,719,458 A | 2/1998 | Kawai |
| 5,720,194 A | 2/1998 | Miller et al. |
| 5,726,517 A | 3/1998 | Gueraud et al. |
| 5,731,649 A | 3/1998 | Caamano |
| 5,735,123 A | 4/1998 | Ehrig |
| 5,736,838 A | 4/1998 | Dove et al. |
| 5,744,896 A | 4/1998 | Kessinger et al. |
| 5,747,964 A | 5/1998 | Turnbull |
| 5,753,989 A | 5/1998 | Syverson et al. |
| 5,760,507 A | 6/1998 | Miller et al. |
| 5,762,584 A | 6/1998 | Daniels |
| 5,773,910 A | 6/1998 | Lange |
| 5,773,962 A | 6/1998 | Nor |
| 5,775,229 A | 7/1998 | Folk et al. |
| 5,777,413 A | 7/1998 | Nagata et al. |
| 5,784,267 A | 7/1998 | Koenig et al. |
| 5,785,137 A | 7/1998 | Reuyl |
| 5,793,137 A | 8/1998 | Smith |
| 5,799,484 A | 9/1998 | Nims |
| 5,801,454 A | 9/1998 | Leininger |
| 5,806,959 A | 9/1998 | Adams et al. |
| 5,833,211 A | 11/1998 | Berling |
| 5,833,440 A | 11/1998 | Berling |
| 5,838,085 A | 11/1998 | Roesel et al. |
| 5,838,138 A | 11/1998 | Henty |
| 5,839,508 A | 11/1998 | Tubel et al. |
| 5,844,342 A | 12/1998 | Taga et al. |
| 5,844,385 A | 12/1998 | Jones et al. |
| 5,850,111 A | 12/1998 | Haaland |
| 5,850,138 A | 12/1998 | Adams et al. |
| 5,850,351 A | 12/1998 | Lotfy et al. |
| 5,850,732 A | 12/1998 | Willis et al. |
| 5,867,004 A | 2/1999 | Drager et al. |
| 5,874,797 A | 2/1999 | Pinkerton |
| 5,886,450 A | 3/1999 | Kuehnle |
| 5,889,348 A | 3/1999 | Muhlberger et al. |
| 5,892,311 A | 4/1999 | Hayasaka |
| 5,893,343 A | 4/1999 | Rigazzi |
| 5,903,113 A | 5/1999 | Yamada et al. |
| 5,912,522 A | 6/1999 | Rivera |
| 5,917,295 A | 6/1999 | Mongeau |
| 5,923,111 A | 7/1999 | Eno et al. |
| 5,939,813 A | 8/1999 | Schoeb |
| 5,942,829 A | 8/1999 | Huynh |
| 5,945,766 A | 8/1999 | Kim et al. |
| 5,952,756 A | 9/1999 | Hsu et al. |
| 5,968,680 A | 10/1999 | Wolfe et al. |
| 5,973,436 A | 10/1999 | Mitcham |
| 5,982,070 A | 11/1999 | Caamano |
| 5,982,074 A | 11/1999 | Smith et al. |
| 5,990,590 A | 11/1999 | Roesel et al. |
| 5,997,252 A | 12/1999 | Miller |
| 5,998,902 A | 12/1999 | Sleder et al. |
| 5,998,969 A | 12/1999 | Tsuji et al. |
| 6,002,192 A | 12/1999 | Krivospitski et al. |
| 6,005,786 A | 12/1999 | Bluemel et al. |
| 6,014,015 A | 1/2000 | Thorne et al. |
| 6,020,711 A | 2/2000 | Rubertus et al. |
| 6,027,429 A | 2/2000 | Daniels |
| 6,032,459 A | 3/2000 | Skowronski |
| 6,034,463 A | 3/2000 | Hansson |
| 6,037,672 A | 3/2000 | Grewe |
| 6,037,696 A | 3/2000 | Sromin et al. |
| 6,043,579 A | 3/2000 | Hill |
| 6,047,104 A | 4/2000 | Cheng |
| 6,055,163 A | 4/2000 | Wagner et al. |
| 6,057,622 A | 5/2000 | Hsu |
| 6,062,016 A | 5/2000 | Edelman |
| 6,064,122 A | 5/2000 | McConnell |
| 6,065,281 A | 5/2000 | Shekleton et al. |
| 6,066,898 A | 5/2000 | Jensen |
| 6,066,906 A | 5/2000 | Kalsi |
| 6,081,053 A | 6/2000 | Maegawa et al. |
| 6,082,112 A | 7/2000 | Shekleton |
| 6,086,250 A | 7/2000 | Rouhet et al. |
| 6,087,750 A | 7/2000 | Raad |
| 6,093,293 A | 7/2000 | Haag et al. |
| 6,093,986 A | 7/2000 | Windhorn |
| 6,097,104 A | 8/2000 | Russell |
| 6,100,809 A | 8/2000 | Novoselsky et al. |
| 6,104,097 A | 8/2000 | Lehoczky |
| 6,104,115 A | 8/2000 | Offringa et al. |
| 6,105,630 A | 8/2000 | Braun et al. |
| 6,109,222 A | 8/2000 | Glezer et al. |
| 6,121,752 A | 9/2000 | Kitahara et al. |
| 6,125,625 A | 10/2000 | Lipinski et al. |
| 6,127,758 A | 10/2000 | Murry et al. |
| 6,149,410 A | 11/2000 | Cooper |
| 6,157,107 A | 12/2000 | Aoshima et al. |
| 6,158,953 A | 12/2000 | Lamont |
| 6,166,473 A | 12/2000 | Hayasaka |
| 6,169,332 B1 | 1/2001 | Taylor et al. |
| 6,170,251 B1 | 1/2001 | Skowronski et al. |
| 6,172,429 B1 | 1/2001 | Russell |
| 6,172,440 B1 | 1/2001 | Sasaki et al. |
| 6,175,210 B1 | 1/2001 | Schwartz et al. |
| 6,177,735 B1 | 1/2001 | Chapman et al. |
| 6,178,751 B1 | 1/2001 | Shekleton et al. |
| 6,181,235 B1 | 1/2001 | Smith |
| 6,189,621 B1 | 2/2001 | Vail |
| 6,191,561 B1 | 2/2001 | Bartel |
| 6,194,802 B1 | 2/2001 | Rao |
| 6,195,869 B1 | 3/2001 | Pullen et al. |
| 6,198,174 B1 | 3/2001 | Nims et al. |
| 6,199,381 B1 | 3/2001 | Unger et al. |
| 6,199,519 B1 | 3/2001 | Van |
| 6,211,633 B1 | 4/2001 | Jones et al. |
| 6,215,206 B1 | 4/2001 | Chitayat |
| 6,218,760 B1 | 4/2001 | Sakuragi et al. |
| 6,226,990 B1 | 5/2001 | Conrad |
| 6,242,827 B1 | 6/2001 | Wolf et al. |
| 6,242,840 B1 | 6/2001 | Denk et al. |
| 6,244,034 B1 | 6/2001 | Taylor et al. |
| 6,246,138 B1 | 6/2001 | Nims |
| 6,255,743 B1 | 7/2001 | Pinkerton et al. |
| 6,265,846 B1 | 7/2001 | Flechsig et al. |
| 6,269,639 B1 | 8/2001 | Conrad |
| 6,269,640 B1 | 8/2001 | Conrad |
| 6,274,945 B1 | 8/2001 | Gilbreth et al. |
| 6,274,960 B1 | 8/2001 | Sakai et al. |

(56) References Cited

U.S. PATENT DOCUMENTS

| | | |
|---|---|---|
| 6,275,012 B1 | 8/2001 | Jabaji |
| 6,276,124 B1 | 8/2001 | Soh et al. |
| 6,279,318 B1 | 8/2001 | Conrad |
| 6,279,319 B1 | 8/2001 | Conrad |
| 6,284,106 B1 | 9/2001 | Haag et al. |
| 6,286,310 B1 | 9/2001 | Conrad |
| 6,288,467 B1 | 9/2001 | Lange et al. |
| 6,291,901 B1 | 9/2001 | Cefo |
| 6,293,101 B1 | 9/2001 | Conrad |
| 6,294,842 B1 | 9/2001 | Skowronski |
| 6,297,977 B1 | 10/2001 | Huggett et al. |
| 6,300,689 B1 | 10/2001 | Smalser |
| 6,307,278 B1 | 10/2001 | Nims et al. |
| 6,307,717 B1 | 10/2001 | Jeong |
| 6,309,268 B1 | 10/2001 | Mabru |
| 6,311,490 B1 | 11/2001 | Conrad |
| 6,311,491 B1 | 11/2001 | Conrad |
| 6,314,773 B1 | 11/2001 | Miller et al. |
| 6,329,783 B1 | 12/2001 | Vrionis et al. |
| 6,332,319 B1 | 12/2001 | Conrad |
| 6,336,326 B1 | 1/2002 | Conrad |
| 6,339,271 B1 | 1/2002 | Noble et al. |
| 6,345,666 B1 | 2/2002 | Conrad |
| 6,348,683 B1 | 2/2002 | Verghese et al. |
| 6,362,718 B1 | 3/2002 | Patrick et al. |
| 6,363,706 B1 | 4/2002 | Meister et al. |
| 6,370,928 B1 | 4/2002 | Chies et al. |
| 6,373,162 B1 | 4/2002 | Liang et al. |
| 6,373,230 B2 | 4/2002 | Jabaji |
| 6,380,648 B1 | 4/2002 | Hsu |
| 6,384,564 B1 | 5/2002 | Pollock |
| 6,397,946 B1 | 6/2002 | Vail |
| 6,405,522 B1 | 6/2002 | Pont et al. |
| 6,407,465 B1 | 6/2002 | Peltz et al. |
| 6,411,003 B1 | 6/2002 | Sasaki et al. |
| 6,420,852 B1 | 7/2002 | Sato |
| 6,435,925 B1 | 8/2002 | Mabru |
| 6,438,937 B1 | 8/2002 | Pont et al. |
| 6,445,101 B2 | 9/2002 | Ley |
| 6,445,105 B1 | 9/2002 | Kliman et al. |
| 6,453,658 B1 | 9/2002 | Willis et al. |
| 6,454,920 B1 | 9/2002 | Haag et al. |
| 6,455,964 B1 | 9/2002 | Nims |
| 6,455,970 B1 | 9/2002 | Shaefer et al. |
| 6,463,730 B1 | 10/2002 | Keller et al. |
| 6,467,725 B1 | 10/2002 | Coles et al. |
| 6,470,933 B1 | 10/2002 | Volpi |
| 6,479,534 B1 | 11/2002 | Bentley et al. |
| 6,483,222 B2 | 11/2002 | Pelrine et al. |
| 6,486,640 B2 | 11/2002 | Adams |
| 6,501,195 B1 | 12/2002 | Barton |
| 6,503,056 B2 | 1/2003 | Eccles et al. |
| 6,504,281 B1 | 1/2003 | Smith et al. |
| 6,512,305 B1 | 1/2003 | Pinkerton et al. |
| 6,518,680 B2 | 2/2003 | McDavid |
| 6,526,757 B2 | 3/2003 | Mackay |
| 6,528,902 B1 | 3/2003 | Barton |
| 6,531,799 B1 | 3/2003 | Miller |
| 6,531,848 B1 | 3/2003 | Chitsazan et al. |
| 6,538,358 B1 | 3/2003 | Krefta et al. |
| 6,541,887 B2 | 4/2003 | Kawamura |
| 6,545,373 B1 | 4/2003 | Andres et al. |
| 6,546,769 B2 | 4/2003 | Miller et al. |
| 6,548,925 B2 | 4/2003 | Noble et al. |
| 6,563,717 B2 | 5/2003 | Lunding et al. |
| 6,565,243 B1 | 5/2003 | Cheung |
| 6,566,764 B2 | 5/2003 | Rebsdorf et al. |
| 6,579,137 B2 | 6/2003 | Mabru |
| 6,590,298 B1 | 7/2003 | Du |
| 6,606,864 B2 | 8/2003 | Mackay |
| 6,622,487 B2 | 9/2003 | Jones |
| 6,631,080 B2 | 10/2003 | Trimble et al. |
| 6,634,176 B2 | 10/2003 | Rouse et al. |
| 6,644,027 B1 | 11/2003 | Kelly |
| 6,647,716 B2 | 11/2003 | Boyd |
| 6,655,341 B2 | 12/2003 | Westerbeke |
| 6,657,348 B2 | 12/2003 | Qin et al. |
| 6,664,688 B2 | 12/2003 | Naito et al. |
| 6,666,027 B1 | 12/2003 | Cardenas |
| 6,669,416 B2 | 12/2003 | Klement |
| 6,672,413 B2 | 1/2004 | Moore et al. |
| 6,675,583 B2 | 1/2004 | Willis et al. |
| 6,677,685 B2 | 1/2004 | Pfleger et al. |
| 6,679,977 B2 | 1/2004 | Haag et al. |
| 6,684,642 B2 | 2/2004 | Willis et al. |
| 6,700,217 B1 | 3/2004 | North et al. |
| 6,700,248 B2 | 3/2004 | Long |
| 6,702,404 B2 | 3/2004 | Anwar et al. |
| 6,703,719 B1 | 3/2004 | McConnell |
| 6,703,747 B2 | 3/2004 | Kawamura |
| 6,707,272 B2 | 3/2004 | Thandiwe |
| 6,710,469 B2 | 3/2004 | McDavid |
| 6,710,491 B2 | 3/2004 | Wu et al. |
| 6,710,492 B2 | 3/2004 | Minagawa |
| 6,710,502 B2 | 3/2004 | Maslov et al. |
| 6,713,936 B2 | 3/2004 | Lee |
| 6,717,313 B1 | 4/2004 | Bae |
| 6,720,688 B1 | 4/2004 | Schiller |
| 6,724,115 B2 | 4/2004 | Kusase |
| 6,727,632 B2 | 4/2004 | Kusase |
| 6,731,019 B2 | 5/2004 | Burns et al. |
| 6,732,531 B2 | 5/2004 | Dickey |
| 6,735,953 B1 | 5/2004 | Wolfe et al. |
| 6,737,829 B2 | 5/2004 | Sastry |
| 6,741,010 B2 | 5/2004 | Wilkin |
| 6,756,719 B1 | 6/2004 | Chiu |
| 6,759,775 B2 | 7/2004 | Grimm |
| 6,765,307 B2 | 7/2004 | Gerber et al. |
| 6,766,647 B2 | 7/2004 | Hartzheim |
| 6,771,000 B2 | 8/2004 | Kim et al. |
| 6,803,696 B2 | 10/2004 | Chen |
| 6,853,107 B2 | 2/2005 | Pyntikov et al. |
| 6,894,411 B2 | 5/2005 | Schmid et al. |
| 6,894,455 B2 | 5/2005 | Cai et al. |
| 6,897,595 B1 | 5/2005 | Chiarenza |
| 6,901,212 B2 | 5/2005 | Masino |
| 6,956,313 B2 | 10/2005 | El-Gabry et al. |
| 6,969,927 B1 | 11/2005 | Lee |
| 7,002,259 B2 | 2/2006 | Howes et al. |
| 7,081,696 B2 | 7/2006 | Ritchey |
| 7,102,248 B2 | 9/2006 | Wobben |
| 7,119,513 B2 | 10/2006 | Ishikawa |
| 7,126,312 B2 | 10/2006 | Moore |
| 7,176,654 B2 | 2/2007 | Meyer et al. |
| 7,193,391 B2 | 3/2007 | Moore |
| 7,239,098 B2 | 7/2007 | Masino |
| 7,248,006 B2 | 7/2007 | Bailey et al. |
| 7,250,702 B2 | 7/2007 | Abou et al. |
| 7,348,764 B2 | 3/2008 | Stewart et al. |
| 7,382,103 B2 | 6/2008 | Shirazee et al. |
| 7,391,180 B2 | 6/2008 | Armiroli et al. |
| 7,400,077 B2 | 7/2008 | Caroon |
| 7,405,490 B2 | 7/2008 | Moehlenkamp |
| 7,427,849 B2 | 9/2008 | Kaneko et al. |
| 7,482,708 B1 | 1/2009 | Barton et al. |
| 7,514,834 B2 | 4/2009 | Takeuchi |
| 7,525,285 B2 | 4/2009 | Plett |
| 7,545,052 B2 | 6/2009 | Llorente et al. |
| 7,554,303 B1 | 6/2009 | Kawamura |
| 7,595,574 B2 | 9/2009 | Ritchey |
| 7,602,158 B1 | 10/2009 | Iacob |
| 7,649,274 B2 | 1/2010 | Burt |
| 7,710,081 B2 | 5/2010 | Saban et al. |
| 7,816,805 B2 | 10/2010 | Tanaka et al. |
| 7,948,141 B2 | 5/2011 | Takeuchi |
| 8,097,970 B2 | 1/2012 | Hyvaerinen |
| 8,106,563 B2 | 1/2012 | Ritchey |
| 8,120,321 B2 | 2/2012 | Vezzini et al. |
| 8,138,620 B2 | 3/2012 | Wagoner et al. |
| 8,212,371 B2 | 7/2012 | Maibach et al. |
| 8,212,445 B2 | 7/2012 | Ritchey |
| 8,247,105 B2 | 8/2012 | Liu |
| 8,278,858 B2 | 10/2012 | Fang et al. |
| 8,288,992 B2 | 10/2012 | Kramer et al. |

(56) References Cited

U.S. PATENT DOCUMENTS

| | | |
|---|---|---|
| 8,310,198 B2 | 11/2012 | Kurimoto et al. |
| 8,330,419 B2 | 12/2012 | Kim et al. |
| 8,368,357 B2 | 2/2013 | Ghantous et al. |
| 8,426,063 B2 | 4/2013 | Lin |
| 8,427,105 B2 | 4/2013 | Plett |
| 8,427,106 B2 | 4/2013 | Kim et al. |
| 8,427,112 B2 | 4/2013 | Ghantous et al. |
| 8,466,595 B2 | 6/2013 | Spooner |
| 8,470,464 B2 | 6/2013 | Troutman |
| 8,513,921 B2 | 8/2013 | Berkowitz et al. |
| 8,564,247 B2 | 10/2013 | Hintz et al. |
| 8,577,529 B2 | 11/2013 | Takahashi et al. |
| 8,610,383 B2 | 12/2013 | De Sousa et al. |
| 8,614,529 B2 | 12/2013 | Ritchey |
| 8,614,563 B2 | 12/2013 | Baughman |
| 8,685,563 B1 | 4/2014 | Lin |
| 8,729,861 B2 | 5/2014 | Nishida et al. |
| 8,796,993 B2 | 8/2014 | White et al. |
| 8,798,832 B2 | 8/2014 | Kawahara et al. |
| 8,823,296 B2 | 9/2014 | De Sousa et al. |
| 8,917,155 B2 | 12/2014 | Adachi et al. |
| 8,928,282 B2 | 1/2015 | Kudo et al. |
| 8,988,045 B2 | 3/2015 | Klein et al. |
| 9,018,898 B2 | 4/2015 | Ziv et al. |
| 9,024,586 B2 | 5/2015 | Vance et al. |
| 9,054,533 B2 | 6/2015 | Gaul et al. |
| 9,093,864 B2 | 7/2015 | Abe et al. |
| 9,121,910 B2 | 9/2015 | Maluf et al. |
| 9,130,377 B2 | 9/2015 | Barsukov et al. |
| 9,147,910 B2 | 9/2015 | Chuah et al. |
| 9,153,845 B2 | 10/2015 | Tanaka et al. |
| 9,153,996 B2 | 10/2015 | De Sousa et al. |
| 9,197,081 B2 | 11/2015 | Finberg et al. |
| 9,230,730 B2 | 1/2016 | Heins |
| 9,365,120 B2 | 6/2016 | Timmons et al. |
| 9,379,552 B2 | 6/2016 | Ritchey et al. |
| 9,395,420 B2 | 7/2016 | White et al. |
| 9,450,274 B2 | 9/2016 | Vo et al. |
| 9,496,727 B2 | 11/2016 | Liu et al. |
| 9,520,613 B2 | 12/2016 | Brockerhoff |
| 9,564,763 B2 | 2/2017 | Finberg et al. |
| 9,579,961 B2 | 2/2017 | Harris |
| 9,669,726 B2 | 6/2017 | Luo et al. |
| 9,705,340 B2 | 7/2017 | Lucea |
| 9,787,107 B2 | 10/2017 | Lutze et al. |
| 9,800,193 B2 | 10/2017 | Mao et al. |
| 9,812,981 B2 | 11/2017 | Ritchey et al. |
| 9,873,342 B2 | 1/2018 | De Sousa et al. |
| 9,885,757 B2 | 2/2018 | Liu et al. |
| 9,902,277 B2 | 2/2018 | Keller et al. |
| 9,948,116 B2 | 4/2018 | Matsumoto et al. |
| 9,960,611 B2 | 5/2018 | Toya |
| 9,979,211 B2 | 5/2018 | Barsukov et al. |
| 10,044,069 B2 | 8/2018 | Despesse |
| 10,069,313 B2 | 9/2018 | Tkachenko et al. |
| 10,073,128 B2 | 9/2018 | Yoshioka et al. |
| 10,074,997 B2 | 9/2018 | Vo et al. |
| 10,093,191 B2 | 10/2018 | Keller et al. |
| 10,103,591 B2 | 10/2018 | Heins |
| 10,147,983 B2 | 12/2018 | Kawahara et al. |
| 10,222,428 B2 | 3/2019 | Saint-Marcoux et al. |
| 10,232,716 B2 | 3/2019 | Higuchi et al. |
| 10,256,643 B2 | 4/2019 | Toya |
| 10,263,435 B2 | 4/2019 | Kim et al. |
| 10,270,263 B2 | 4/2019 | Brozek |
| 10,277,041 B2 | 4/2019 | Zane et al. |
| 10,291,162 B1 | 5/2019 | Heins |
| 10,298,026 B2 | 5/2019 | Trimboli et al. |
| 10,305,298 B2 | 5/2019 | Kristensen |
| 10,305,409 B2 | 5/2019 | Wang et al. |
| 10,330,732 B2 | 6/2019 | Roumi et al. |
| 10,416,236 B2 | 9/2019 | Uchino et al. |
| 10,483,791 B2 | 11/2019 | Mergener et al. |
| 10,483,899 B2 | 11/2019 | Hustedt |
| 10,543,303 B2 | 1/2020 | Zilbershlag et al. |
| 10,561,775 B2 | 2/2020 | Zilbershlag |
| 10,615,610 B1 | 4/2020 | Jelinek |
| 10,644,537 B2 | 5/2020 | Krishnan et al. |
| 10,778,014 B2 | 9/2020 | Barsukov et al. |
| 10,833,512 B2 | 11/2020 | Remboski et al. |
| 10,910,846 B2 | 2/2021 | Jelinek |
| 10,958,075 B2 | 3/2021 | Collins et al. |
| 10,958,083 B2 | 3/2021 | Halsey |
| 10,985,552 B2 | 4/2021 | Tada et al. |
| 10,985,587 B2 | 4/2021 | Matsumura et al. |
| 10,992,144 B2 | 4/2021 | Li et al. |
| 10,992,145 B2 | 4/2021 | Wang et al. |
| 10,992,146 B2 | 4/2021 | Flowers et al. |
| 11,005,276 B2 | 5/2021 | Lee et al. |
| 11,095,148 B2 | 8/2021 | Mergener et al. |
| 11,128,153 B1 | 9/2021 | Cho et al. |
| 11,133,680 B2 | 9/2021 | Wang et al. |
| 11,171,494 B2 | 11/2021 | Tang et al. |
| 11,277,012 B2 | 3/2022 | Ono et al. |
| 11,336,104 B2 | 5/2022 | Poland et al. |
| 11,777,329 B2 * | 10/2023 | Osswald ............ H02J 7/00712 320/112 |
| 2002/0012261 A1 | 1/2002 | Moindron |
| 2002/0047418 A1 | 4/2002 | Seguchi et al. |
| 2002/0057030 A1 | 5/2002 | Fogarty |
| 2002/0070707 A1 | 6/2002 | Sato |
| 2003/0047209 A1 | 3/2003 | Yanai et al. |
| 2004/0021437 A1 | 2/2004 | Maslov et al. |
| 2004/0037221 A1 | 2/2004 | Aisa |
| 2004/0174652 A1 | 9/2004 | Lewis |
| 2004/0232796 A1 | 11/2004 | Weissensteiner |
| 2004/0251761 A1 | 12/2004 | Hirzel |
| 2005/0013085 A1 | 1/2005 | Kinsella et al. |
| 2005/0024015 A1 | 2/2005 | Houldsworth et al. |
| 2005/0052155 A1 | 3/2005 | Surig |
| 2005/0099314 A1 | 5/2005 | Aisa |
| 2005/0156574 A1 * | 7/2005 | Sato ............... H02H 7/18 320/134 |
| 2005/0184689 A1 | 8/2005 | Maslov et al. |
| 2005/0212487 A1 | 9/2005 | Sodeno |
| 2005/0248440 A1 | 11/2005 | Stevens |
| 2005/0269989 A1 | 12/2005 | Geren et al. |
| 2005/0280264 A1 | 12/2005 | Nagy |
| 2006/0022639 A1 | 2/2006 | Moore |
| 2006/0022676 A1 | 2/2006 | Uesaka et al. |
| 2006/0033475 A1 | 2/2006 | Moore |
| 2006/0055377 A1 * | 3/2006 | Okubo ............ F03D 9/255 320/166 |
| 2006/0056127 A1 | 3/2006 | Lewis |
| 2006/0092583 A1 * | 5/2006 | Alahmad ............ H02J 7/0024 361/15 |
| 2006/0097698 A1 | 5/2006 | Plett |
| 2006/0232069 A1 | 10/2006 | Lim et al. |
| 2006/0273766 A1 | 12/2006 | Kawamura |
| 2007/0008669 A1 | 1/2007 | Al-Haddad |
| 2007/0073445 A1 | 3/2007 | Llorente et al. |
| 2007/0182273 A1 | 8/2007 | Burt |
| 2007/0210733 A1 | 9/2007 | Du et al. |
| 2007/0276547 A1 * | 11/2007 | Miller .............. H02J 7/34 705/412 |
| 2008/0012538 A1 | 1/2008 | Stewart et al. |
| 2008/0088200 A1 | 4/2008 | Ritchey |
| 2008/0106100 A1 | 5/2008 | Hyvarinen |
| 2008/0116759 A1 | 5/2008 | Lin |
| 2008/0116847 A1 * | 5/2008 | Loke .............. H02J 7/00308 320/108 |
| 2008/0266742 A1 | 10/2008 | Henke et al. |
| 2009/0027006 A1 | 1/2009 | Vezzini et al. |
| 2009/0066291 A1 | 3/2009 | Tien et al. |
| 2009/0078481 A1 | 3/2009 | Harris |
| 2009/0079397 A1 | 3/2009 | Ibrahim |
| 2009/0167247 A1 | 7/2009 | Bai et al. |
| 2009/0208837 A1 | 8/2009 | Lin |
| 2009/0251100 A1 | 10/2009 | Incledon et al. |
| 2009/0267414 A1 | 10/2009 | Kiyohara et al. |
| 2010/0019593 A1 | 1/2010 | Ritchey |
| 2010/0073970 A1 | 3/2010 | Abolhassani et al. |
| 2010/0090553 A1 | 4/2010 | Ritchey |
| 2010/0164437 A1 | 7/2010 | McKinley |

(56) References Cited

U.S. PATENT DOCUMENTS

| | | |
|---|---|---|
| 2010/0207580 A1 | 8/2010 | Nishida et al. |
| 2010/0244781 A1 | 9/2010 | Kramer et al. |
| 2010/0244847 A1 | 9/2010 | Kudo et al. |
| 2010/0259219 A1 | 10/2010 | Yokomizo et al. |
| 2010/0261043 A1 | 10/2010 | Kim et al. |
| 2010/0261048 A1 | 10/2010 | Kim et al. |
| 2010/0305792 A1 | 12/2010 | Wilk et al. |
| 2011/0057617 A1 | 3/2011 | Finberg et al. |
| 2011/0078470 A1 | 3/2011 | Wang et al. |
| 2011/0089897 A1 | 4/2011 | Zhang et al. |
| 2011/0127960 A1 | 6/2011 | Plett |
| 2011/0169454 A1 | 7/2011 | Maruyama et al. |
| 2011/0241630 A1 | 10/2011 | Ritchey et al. |
| 2011/0260687 A1 | 10/2011 | Kudo et al. |
| 2011/0266806 A1 | 11/2011 | Numajiri |
| 2012/0013304 A1 | 1/2012 | Murase et al. |
| 2012/0065824 A1 | 3/2012 | Takahashi et al. |
| 2012/0074898 A1 | 3/2012 | Schwartz |
| 2012/0091964 A1 | 4/2012 | Vance et al. |
| 2012/0094150 A1 | 4/2012 | Troutman |
| 2012/0112688 A1 | 5/2012 | Ho |
| 2012/0194403 A1 | 8/2012 | Cordier et al. |
| 2012/0206105 A1 | 8/2012 | Nishizawa et al. |
| 2012/0229060 A1 | 9/2012 | Ritchey et al. |
| 2012/0239214 A1 | 9/2012 | Nakashima et al. |
| 2012/0256592 A1 | 10/2012 | Baughman |
| 2012/0274331 A1 | 11/2012 | Liu et al. |
| 2012/0319493 A1 | 12/2012 | Kim et al. |
| 2013/0002182 A1* | 1/2013 | Bates ............... H02P 27/08 318/495 |
| 2013/0002183 A1* | 1/2013 | Bates ............... H02P 27/08 318/495 |
| 2013/0002201 A1 | 1/2013 | Bodkin et al. |
| 2013/0009595 A1* | 1/2013 | Brown ............. F28D 15/0266 320/108 |
| 2013/0020979 A1* | 1/2013 | Bates ............... H02P 23/14 318/497 |
| 2013/0026989 A1 | 1/2013 | Gibbs et al. |
| 2013/0026993 A1 | 1/2013 | Hintz et al. |
| 2013/0033231 A1 | 2/2013 | Zhang |
| 2013/0065093 A1 | 3/2013 | White et al. |
| 2013/0069598 A1 | 3/2013 | Tanaka et al. |
| 2013/0169234 A1 | 7/2013 | Chuah et al. |
| 2013/0175954 A1 | 7/2013 | Astigarraga et al. |
| 2013/0175966 A1* | 7/2013 | Astigarraga ....... H02P 25/184 318/497 |
| 2013/0207599 A1 | 8/2013 | Ziv et al. |
| 2013/0257382 A1 | 10/2013 | Field et al. |
| 2014/0015488 A1 | 1/2014 | Despesse |
| 2014/0021924 A1 | 1/2014 | Abe et al. |
| 2014/0077752 A1 | 3/2014 | Barsukov et al. |
| 2014/0103850 A1 | 4/2014 | Frank |
| 2014/0145684 A1 | 5/2014 | Liu et al. |
| 2014/0167708 A1 | 6/2014 | Ritchey |
| 2014/0167780 A1 | 6/2014 | White et al. |
| 2014/0252922 A1 | 9/2014 | Ritchey et al. |
| 2014/0253271 A1 | 9/2014 | Heins |
| 2014/0265994 A1 | 9/2014 | Mao |
| 2014/0287278 A1 | 9/2014 | Despesse |
| 2014/0292283 A1 | 10/2014 | Timmons et al. |
| 2014/0312828 A1 | 10/2014 | Vo et al. |
| 2014/0327407 A1 | 11/2014 | Lucea |
| 2014/0347903 A1 | 11/2014 | Ritchey et al. |
| 2014/0361743 A1* | 12/2014 | Lin .................. B60L 58/15 320/109 |
| 2014/0363881 A1* | 12/2014 | Caiafa ............... H03K 3/57 307/82 |
| 2014/0368168 A1 | 12/2014 | Beckman |
| 2015/0028817 A1 | 1/2015 | Brockerhoff |
| 2015/0102779 A1 | 4/2015 | Schumacher et al. |
| 2015/0219721 A1 | 8/2015 | Yang et al. |
| 2015/0231985 A1 | 8/2015 | Li |
| 2015/0244313 A1* | 8/2015 | McNamara ......... H02J 3/38 136/244 |
| 2015/0280466 A1* | 10/2015 | Owen ............... B60L 50/51 320/137 |
| 2015/0380959 A1 | 12/2015 | Chang et al. |
| 2016/0043579 A1 | 2/2016 | Finberg et al. |
| 2016/0072316 A1 | 3/2016 | Barsukov et al. |
| 2016/0089994 A1 | 3/2016 | Keller et al. |
| 2016/0105042 A1 | 4/2016 | Taylor et al. |
| 2016/0111900 A1 | 4/2016 | Beaston et al. |
| 2016/0134210 A1 | 5/2016 | Bock et al. |
| 2016/0190830 A1 | 6/2016 | Kuhlmann et al. |
| 2016/0241054 A1 | 8/2016 | Matsumoto et al. |
| 2016/0254683 A1 | 9/2016 | Matsumoto et al. |
| 2016/0336764 A1 | 11/2016 | Becker et al. |
| 2016/0336765 A1 | 11/2016 | Trimboli et al. |
| 2016/0336767 A1 | 11/2016 | Zane et al. |
| 2016/0351976 A1 | 12/2016 | Kawahara et al. |
| 2017/0016961 A1 | 1/2017 | Lucea |
| 2017/0054306 A1 | 2/2017 | Vo et al. |
| 2017/0104347 A1 | 4/2017 | Shimonishi et al. |
| 2017/0146609 A1 | 5/2017 | Uchino et al. |
| 2017/0214253 A1 | 7/2017 | Kim et al. |
| 2017/0264110 A1 | 9/2017 | Toya |
| 2017/0271893 A1 | 9/2017 | Brozek |
| 2017/0299660 A1 | 10/2017 | Saint-Marcoux et al. |
| 2017/0346334 A1 | 11/2017 | Mergener et al. |
| 2018/0008760 A1 | 1/2018 | Zilbershlag et al. |
| 2018/0019694 A1 | 1/2018 | Spickard |
| 2018/0056798 A1 | 3/2018 | Syouda |
| 2018/0062402 A1 | 3/2018 | Syouda |
| 2018/0123357 A1 | 5/2018 | Beaston et al. |
| 2018/0134168 A1 | 5/2018 | Keller et al. |
| 2018/0145520 A1 | 5/2018 | Sasaki et al. |
| 2018/0183298 A1 | 6/2018 | Severson |
| 2018/0219390 A1 | 8/2018 | Tkachenko et al. |
| 2018/0226810 A1 | 8/2018 | Barsukov et al. |
| 2018/0241227 A1 | 8/2018 | Halsey |
| 2018/0278146 A1 | 9/2018 | Guven et al. |
| 2018/0301929 A1 | 10/2018 | Krishnan et al. |
| 2018/0337536 A1 | 11/2018 | Li et al. |
| 2018/0339093 A1 | 11/2018 | Zilbershlag |
| 2018/0366959 A1 | 12/2018 | Coenen |
| 2019/0103750 A1* | 4/2019 | Kristensen ......... H01M 10/441 |
| 2019/0115849 A1* | 4/2019 | Götz ................. H02P 25/22 |
| 2019/0148952 A1 | 5/2019 | Remboski et al. |
| 2019/0229540 A1 | 7/2019 | Lee et al. |
| 2019/0273380 A1 | 9/2019 | Collins et al. |
| 2019/0280488 A1 | 9/2019 | Tang et al. |
| 2019/0288526 A1* | 9/2019 | Jaensch ............. H01M 10/425 |
| 2019/0299799 A1 | 10/2019 | Hinterberger et al. |
| 2019/0334354 A1 | 10/2019 | Mizukami et al. |
| 2019/0393696 A1 | 12/2019 | Tada et al. |
| 2020/0036047 A1 | 1/2020 | Aikens et al. |
| 2020/0044459 A1 | 2/2020 | Lee et al. |
| 2020/0052524 A1 | 2/2020 | Mergener et al. |
| 2020/0099110 A1 | 3/2020 | Lin |
| 2020/0122580 A1 | 4/2020 | Zou et al. |
| 2020/0144952 A1 | 5/2020 | Mao et al. |
| 2020/0203961 A1 | 6/2020 | Flowers et al. |
| 2020/0220364 A1 | 7/2020 | Wang et al. |
| 2020/0244076 A1 | 7/2020 | Wang et al. |
| 2020/0274203 A1 | 8/2020 | Kirleis et al. |
| 2020/0274368 A1 | 8/2020 | Crouse |
| 2020/0274371 A1 | 8/2020 | Kirleis et al. |
| 2020/0274386 A1 | 8/2020 | Kirleis et al. |
| 2020/0321788 A1 | 10/2020 | Ono et al. |
| 2020/0373801 A1 | 11/2020 | Kinjo et al. |
| 2020/0381925 A1 | 12/2020 | Jelinek |
| 2020/0403420 A1 | 12/2020 | Nagase et al. |
| 2020/0412159 A1 | 12/2020 | Snyder et al. |
| 2021/0013784 A1 | 1/2021 | Shirazee |
| 2021/0044119 A1 | 2/2021 | Poland et al. |
| 2021/0075230 A1 | 3/2021 | Ono et al. |
| 2021/0083506 A1* | 3/2021 | Rao .................. H02J 3/14 |
| 2021/0098996 A1 | 4/2021 | Ono et al. |
| 2021/0098998 A1 | 4/2021 | Eo |
| 2021/0135489 A1* | 5/2021 | Stites-Clayton ...... B60L 55/00 |
| 2021/0234380 A1 | 7/2021 | Ono et al. |
| 2021/0249873 A1 | 8/2021 | Despesse et al. |
| 2021/0257947 A1 | 8/2021 | Kinjo et al. |

(56) References Cited

U.S. PATENT DOCUMENTS

| | | | |
|---|---|---|---|
| 2021/0257949 A1 | 8/2021 | McDonald et al. | |
| 2021/0273461 A1 | 9/2021 | Lin et al. | |
| 2021/0296912 A1 | 9/2021 | Cho et al. | |
| 2021/0302505 A1 | 9/2021 | Worry et al. | |
| 2021/0313830 A1 | 10/2021 | Dowler et al. | |
| 2021/0408856 A1 | 12/2021 | Fukunaga | |
| 2022/0060029 A1 | 2/2022 | Syouda et al. | |
| 2022/0216728 A1* | 7/2022 | Ashman | G01R 22/063 |
| 2022/0407334 A1 | 12/2022 | Kouda et al. | |

FOREIGN PATENT DOCUMENTS

| | | |
|---|---|---|
| CA | 1038918 A | 9/1978 |
| CA | 2341095 A1 | 10/2001 |
| CA | 2459126 A1 | 4/2003 |
| CA | 2543354 C | 12/2014 |
| CN | 1082740 C | 4/2002 |
| CN | 101582672 A | 11/2009 |
| CN | 102148111 A | 8/2011 |
| CN | 102484448 A | 5/2012 |
| CN | 202841012 U | 3/2013 |
| CN | 107683554 A | 2/2018 |
| DE | 19733208 C1 | 10/1998 |
| DE | 102006033629 A1 | 1/2008 |
| EP | 0603778 B1 | 6/1996 |
| EP | 0613234 B1 | 11/2001 |
| EP | 1416604 A2 | 5/2004 |
| EP | 1413046 B1 | 5/2006 |
| EP | 1717946 A2 | 11/2006 |
| EP | 1068663 B1 | 5/2008 |
| EP | 1680861 B1 | 1/2009 |
| EP | 2797221 A1 | 10/2014 |
| EP | 3360795 A1 | 8/2018 |
| JP | 2001161098 A | 6/2001 |
| JP | 2001204198 A | 7/2001 |
| JP | 3481037 B2 | 12/2003 |
| JP | 2004336836 A | 11/2004 |
| JP | 2006521781 A | 9/2006 |
| JP | 2007097341 A | 4/2007 |
| JP | 2009080093 A | 4/2009 |
| JP | 4790618 B2 | 7/2011 |
| JP | 2013247003 A | 12/2013 |
| JP | 5798015 B2 | 8/2015 |
| KR | 1020070082819 | 8/2007 |
| KR | 102066323 B1 | 1/2020 |
| SE | 9701662 | 6/1998 |
| WO | 8100651 A1 | 3/1981 |
| WO | 8807782 A1 | 10/1988 |
| WO | 9708009 A1 | 3/1997 |
| WO | 9808291 A1 | 2/1998 |
| WO | 9848290 A1 | 10/1998 |
| WO | 2004001949 A1 | 12/2003 |
| WO | 2004004109 A2 | 1/2004 |
| WO | 2004088832 A1 | 10/2004 |
| WO | 2005043740 A2 | 5/2005 |
| WO | 2007098227 A2 | 8/2007 |
| WO | 2008067649 A2 | 6/2008 |
| WO | 2008091035 A1 | 7/2008 |
| WO | 2008119864 A1 | 10/2008 |
| WO | 2010057892 A1 | 5/2010 |
| WO | 2010057893 A1 | 5/2010 |
| WO | 2013155601 A1 | 10/2013 |
| WO | 2017219136 A1 | 12/2017 |
| WO | 2018213919 A1 | 11/2018 |
| WO | 2020047663 A1 | 3/2020 |
| WO | 2021001046 A1 | 1/2021 |
| WO | 2021094744 A1 | 5/2021 |

OTHER PUBLICATIONS

Maslov, et al. "Low-Speed High-Torque Brushless PM Motor for Propulsion Applicatins With an Advanced Magentic Path Design," U.S. Appl. No. 60/399,415, filed Jul. 31, 2002, 18 pages.

Non Final Office Action for U.S. Appl. No. 17/842,217, mailed Aug. 8, 2022, 25 pages.

International Search Report and Written Opinion mailed Aug. 15, 2022 in PCT/CA2022/050753.

International Search Report and Written Opinion mailed Sep. 21, 2022 in PCT/CA2022/050620, 17 pages.

Non Final Office Action for U.S. Appl. No. 17/727,143, mailed Aug. 22, 2022, 28 pages.

Non-Final Office Action Issued in U.S. Appl. No. 17/742,727, mailed Aug. 2, 2023, 9 pages.

Notice of Allowance for U.S. Appl. No. 17/727,143, mailed Sep. 20, 2023.

Babaei, et a;, "New cascaded multilevel inverter topology with minimum number of switches", Energy Conversion and Management 50 (2009) 2761-2767, 7 pages.

Final Office Action for U.S. Appl. No. 17/727,143, mailed Feb. 16, 2023, 26 pages.

Horsche et al., "Realising Serial Hybrid Energy Storage Systems (sHESS) by implementing Switching Circuits on Battery Cell Level", EVS29 Symposium, Montreal Quebec, Canada, Jun. 19-22, 2016.

International Search Report and Written Opinion for PCT/CA2022/000039, mailed Nov. 23, 2022, 12 pages.

Non-Final Office Action Issued in U.S. Appl. No. 17/727,143, mailed Jun. 9, 2023, 28 pages.

Notice of Allowance for U.S. Appl. No. 17/605,354, mailed Mar. 20, 2023, 12 pages.

Notice of Allowance for U.S. Appl. No. 17/842,217, mailed Apr. 12, 2023, 10 pages.

Speltino, et al., "Cell Equalization in Battery Stacks Through State of Charge Estimation Polling", 2010 American Control Conference Marriott Waterfront, Baltimore, MD, USA Jun. 30-Jul. 2, 2010, 6 pages.

Welsh, "A Comparison of Active and Passive Cell Balancing Techniques for Series/Parallel Battery Packs" Thesis, Electrical and Computer Engineering Graduate Program, The Ohio State University, 2009, 115 pages.

Eckart Nipp, "Alternative to Field-Weakening of Surface-Mounted Permanent-magnet Motors for Variable-Speed Drives", IEEE Xplore 1995, 8 pages.

Huang, et al., "Electrical Two-Speed Propulsion by Motor Winding Switching and Its Control Strategies for Electric Vehicles" IEEE transactions on Vehicular Technology, vol. 48, No. 2, Mar. 1999, 12 pages.

Tang et al., "A Reconfigurable-Winding System For Electric Vehicle Drive Applications", 2017 IEEE Transportation Electrification Conference and Expo (ITEC), 6 pages.

Tang, "Electric Motor Performance Improvement Techniques", 2016 U.S. DOE Vehicle Technologies Office Review, Project ID:EDT071, Oak Ridge National Laboratory, 23 pages.

Canadian Examination Report, mailed Mar. 3, 2017, for CA 2,773,102, 4 pages.

Canadian Examination Report, mailed Nov. 1, 2017, for CA 2,773,040, 4 pages.

Canadian Office Action, for Canadian Application No. 2,487,668, dated Oct. 6, 2011, 4 pages.

Canadian Office Action, for Canadian Application No. 3,061,619, dated Sep. 2, 2021, 4 pages.

European Examination Report, mailed Apr. 18, 2017, for EP 10 814 529.3, 6 pages.

Extended European Search Report, mailed Oct. 14, 2020, for EP 18806122, 7 pages.

Luis Orozco et al., "Power Efficient Battery Formation/Testing System with Energy Recycling," Analog Devices, 4 pages, Year: 2015.

International Preliminary Report on Patentability and Written Opinion, issued Mar. 6, 2012, for PCT/US2010/047750, 5 pages.

Notice of Allowance mailed Jun. 15, 2021, for Ritchey, "Variable Coil Configuration System Control, Apparatus and Method," U.S. Appl. No. 16/615,493, 10 pages.

International Search Report and Written Opinion, mailed Jun. 2, 2020, for PCT/CA2020/050534, 10 pages.

(56) References Cited

OTHER PUBLICATIONS

International Search Report and Written Opinion, mailed May 24, 2011, for PCT/US2010/047750, 7 pages.
International Search Report and Written Opinion, mailed May 8, 2018, for PCT/CA2018/050222, 8 pages.
Villani M., et al., "Fault-tolerant brushless DC drive for aerospace application. In the XIX International Conference on Electrical Machines—ICEM Sep. 6, 2010", 1-7.
International Search Report and Written Opinion, mailed Oct. 6, 2020, in PCT/IB2020/056080, 10 pages.
International Search Report and Written Opinion, mailed Sep. 28, 2007, for PCT/CA2007/001040, 8 pages.
Jianqiang Wang et al., "Study of High-capacity Single-body Li-ion Battery Charging and Discharging System," (PEDS) Nov. 2, 2009,pp. 46-48.
Notice of Allowance for U.S. Appl. No. 17/860,798, mailed May 16, 2024, 9 pages.
"New Motor architecture could be a game-changer", High Power Media Ltd., E-Mobility Engineering, 2021, 6 pages.
"Single Wound and Dual Winding Motor", Yaskawa America, Models & Ratings, 220v Motor/400V Motor, Standard 200V Series, on or before Oct. 28, 2021.
"What is Dynamic Torque Switching?", Info@epropelled.com, 4 pages, on or before Oct. 28, 2021.
Anders, "Analysis of a gas turbine driven hybrid drive system for heavy vehicles", Thesis/Dissertation, Etdeweb, U.S. Department of Energy Office of Scientific and Technical Information, Jul. 1, 1999, 4 pages.
Eckart Nipp, "Permanent Magnet Motor Drives with Switched Stator Windings", Kungl Tekniska Hogskolan, TRITA-EMD-9905 ISSN-1102-0172, Submitted to the School of Electric Engineering and Information Technology, 1999, 315 pages.
Canadian Examination Report, mailed Jan. 12, 2024, for Canadian Patent Application No. 3,111,825, PCT No. CA2019051239, 3 pages.
Non Final Office Action for U.S. Appl. No. 17/274,038, mailed Feb. 9, 2024, 15 pages.
Zhang, et al., "A harmonic injection method for improving NVH performance permanent magnet synchronous motor", Journal of Physics: Conference Series, 1802 (2021) 032132, 6 pages.

\* cited by examiner

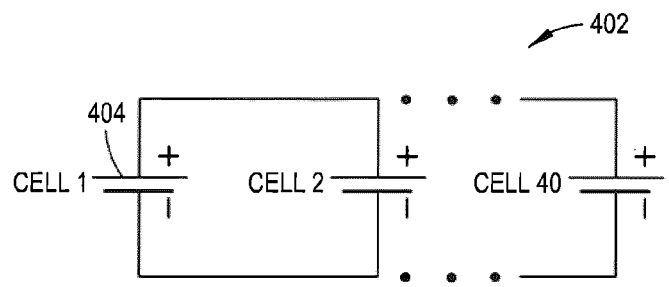
FIG.4A
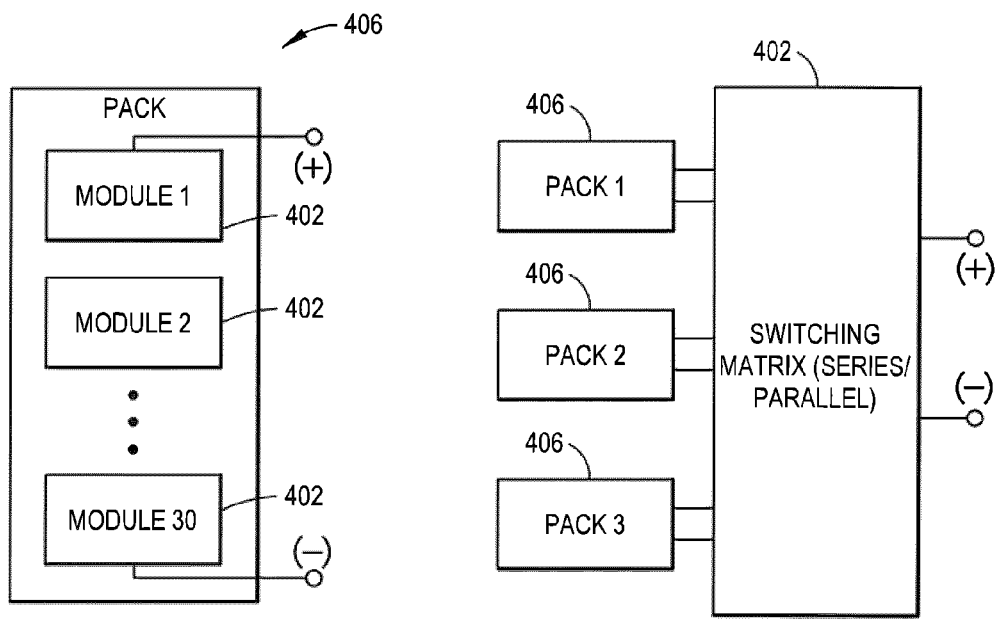
FIG.4B
FIG.4C

SYSTEMS AND METHODS FOR INTELLIGENT ENERGY STORAGE AND PROVISIONING USING AN ENERGY STORAGE CONTROL SYSTEM

BACKGROUND

Technical Field

The present disclosure generally relates to control of energy storage and provision of energy to and from an energy storage system.

Description of the Related Art

Traditional fixed configuration battery architectures are subject to considerable limitations where battery management is concerned, and this is due to design limitations and lack of flexibility for both the rotating electric machines and the associated energy storage systems. As battery packs are repeatedly charged and discharged, individual battery cells may exhibit different characteristics—for instance, some cells may charge or discharge faster than others. Cells exhibiting abnormal characteristics may overcharge or undercharge and continue to degrade more quickly than healthy cells. The abnormal performance of these unhealthy cells decreases the efficiency of the system as a whole and may cause damage to other cells. For instance, unhealthy cells may limit the operational cycle of the entire battery collective and may cause more serious problems, such as extreme heating and even explosion due to the impacts of thermal runaway conditions.

Two problems with conventional battery powered devices are over-exhaustion of energy stores and poor energy conversion efficiency. Because of these challenges, some systems have been developed to manage charging and discharging to improve the capability and efficiency of the battery systems for various applications. Although some progress has been made to improve the operation of energy storage systems with respect to the aforementioned issues, there remain difficult and complex challenges in the control of the storage and release of stored energy.

SUMMARY

A method of operation in an energy storage and provisioning system may be summarized as including: receiving, in an energy storage system comprising energy storage cells, electrical power from a power generator, each of the energy storage cells comprising one or more switching elements selectively operable to connect with one or more terminals of other ones of the energy storage cells; determining, by a control subsystem comprising one or more processors and memory, a condition of a plurality of the energy storage cells via electrical measurement; grouping, by controlling operation of the one or more switching elements of the energy storage cells, a subset of the plurality of energy storage cells into a topology configuration based at least in part on a condition of individual cells of the subset of energy storage cells, the topology configuration corresponding to an interconnection relationship of the subset of energy storage cells; and storing the received electrical power into the subset of energy storage cells arranged into the topology configuration to optimize storage of the electrical power received from the power generator.

In the method, the grouping of the subset of the plurality of energy storage cells into the topology configuration may include causing a switching element of each of the energy storage cells to be connected to a terminal of another energy storage cell of the subset of the plurality of energy storage cells based at least on the topology configuration. The topology configuration may be one of an electrically parallel interconnection of the subset of the plurality of energy storage cells or an electrically series interconnection of the subset of the plurality of energy storage cells. The method may further include receiving information regarding an attribute of the electrical power, wherein the grouping of the subset of the plurality of energy storage cells into the topology configuration is based at least in part on the condition of individual cells of the subset of the plurality of energy storage cells and the attribute of the electrical power. In the method, the condition of each of the individual cells of the subset of energy storage cells may be indicative of a rate at which a respective one of the individual cells is currently capable of charging or the charge capacity of the a respective one of the individual cells. The condition of each of the individual cells of the subset of energy storage cells may be indicative of health of a respective one of the individual cells.

An energy storage and provisioning system may be summarized as including: an energy storage system comprising a plurality of energy storage cells, each of the energy storage cells comprising at least one switching element selectively operable to connect with one or more terminals of other ones of the energy storage cells, the energy storage system having one or more inputs for receiving power from an electrical power generator and one or more outputs for providing power to a load; and a control subsystem comprising one or more processors and non-transitory memory storing a set of instructions that, as a result of execution by the one or more processors, cause the control subsystem to: obtain information regarding an attribute of electrical power that is to be received at an input of the energy storage system or to be provided from an output of the energy storage system, determine a topology configuration in which to arrange at least a subset of the plurality of the energy storage cells, the topology configuration determined based at least in part on the attribute of the electrical power, and cause the switching elements of the plurality of energy storage cells to be in respective switching states to form the topology configuration. In the energy storage and provisioning system, the topology configuration may be one of a parallel interconnection of the subset of the plurality of energy storage cells or a series interconnection of the subset of the plurality of energy storage cells. The set of instructions may further cause the control subsystem to determine a condition of each of the plurality of energy storage cells, the condition being based at least in part on measured electrical characteristics of the respective energy storage cell, wherein determining the topology configuration is based at least in part on the condition of each of the plurality of energy storage cells. The energy storage and provisioning system may further include a power converter connected to at least the subset of the plurality of energy storage cells and an output of a power generator, wherein, in operation, the power converter converts a direct current output from the subset of the energy storage cells into an alternating current output having a specified set of electrical characteristics, and converts the output of the power generator into the alternating current output having the specified set of electrical characteristics. The power generator may include a stator having a plurality of coils and a plurality of electronic modules that generate wavelets in response to interaction of an electromagnetic field with one or more of the plurality of coils, the output of the power generator corresponding to the wavelets generated. The set of instructions further cause the control subsystem to: determine a second topology configuration in which to arrange at least a subset of a plurality of coils of the power generator; and cause the plurality of coils to be connected to form the second topology configuration.

A method to control a power system comprising battery cells, the power system charging and discharging the battery cells, may be summarized as including: determining, by a control subsystem comprising one or more processors and memory, charging characteristics of at least some of the battery cells via electrical measurement; determining, by the control system, one or more attributes of electrical power received from an electric power generator; causing at least a first subset of the battery cells to be connected to each other in a first configuration based at least in part on the charging characteristics of the first subset of the battery cells and the one or more attributes of the electrical power received; and providing the received electric power to the first subset of the battery cells. The method may further include: determining a power requirement of a load electrically coupled to the power system; determining a discharge characteristic of at least some of the battery cells; causing at least a second subset of the battery cells to be connected to each other in a second configuration based at least on the discharge characteristics of the second subset of the battery cells and the power requirement of the load; and discharging electric power stored by the second subset of the battery cells to the load.

BRIEF DESCRIPTION OF THE DRAWINGS

FIGS. 4A-4C show a set of structures of a DC power supply for driving a motor, according to at least one disclosed implementation.

DETAILED DESCRIPTION

Figure 1:
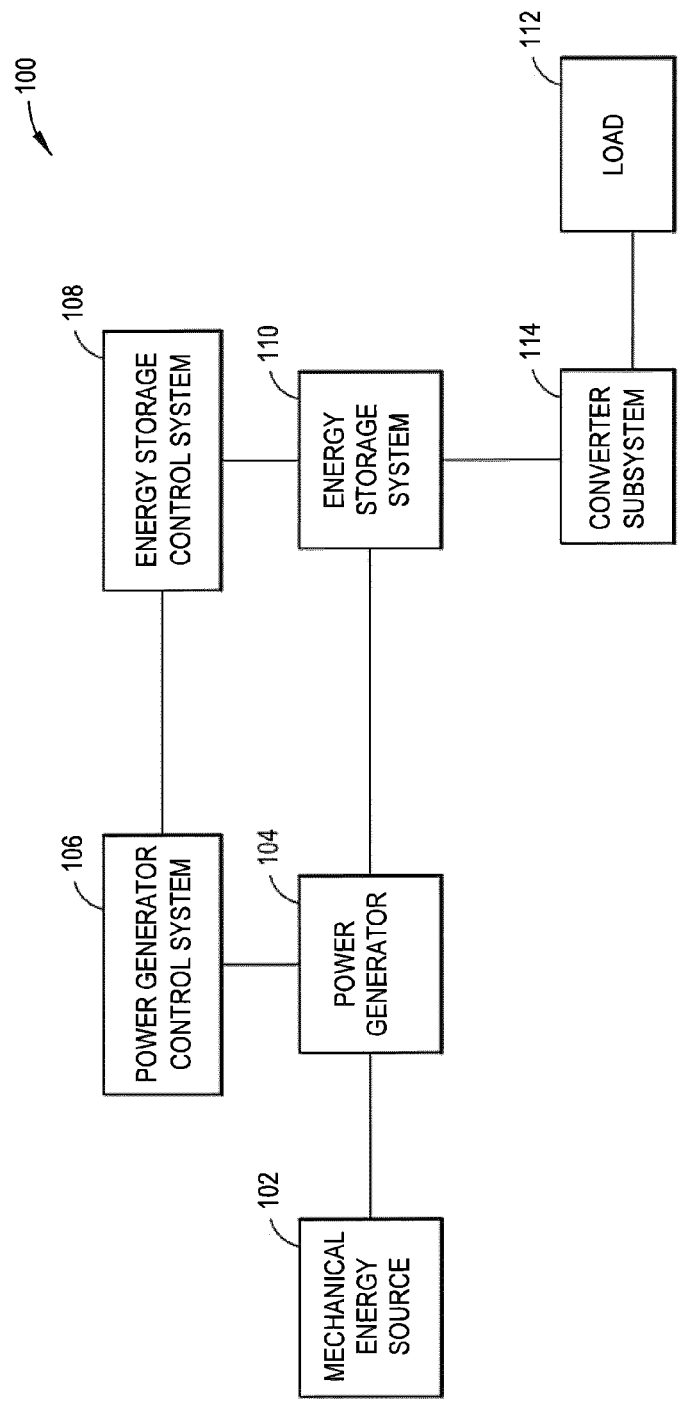
FIG. 1 depicts a system in which electrical power is generated and stored in a plurality of battery cells, according to at least one disclosed implementation.

This application claims priority to U.S. Provisional Patent Application No. 62/727,483, filed Sep. 5, 2018, which is hereby incorporated by reference in its entirety.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

The headings and abstract provided herein are for convenience only and do not interpret the scope or meaning of the implementations.

Systems and methods are described and illustrated herein that control the rotating electric machine as well as the associated charging and discharging of battery cells. The described technologies include a system-level approach to energy capture, storage, and release through use of system-level control providing coordinated feedback and optimization of all system components. A reconfigurable power generator and a reconfigurable energy storage system are provided to adjust power output characteristics and charging characteristics of an energy storage system. A control system is provided that may control power output characteristics of a power generator. Relationships between power production elements, such as inductors, may be reconfigured to be series and or parallel to help optimize energy generation and capture. In addition, the control provided for reconfiguring the rotating electric machine provides a unique ability to alter the magnetic distribution within the machine. As an example, this may include altering the magnetic characteristic of the stator from a two pole architecture to a four pole architecture. While the ability to alter the series and parallel configurations within the machine provide for altered speed torque characteristics for a given input, the magnetic distribution alterations provide additional benefits that include moving the efficiency curve for the machine.

This type of generator can work in harmony with other control systems, as well as all other system controls such as rectification control, single or multilevel power converters, and power optimization elements that manage power characteristics and quality. For example, where a traditional system may include control circuitry for many separate components, which may not be able to communicate with each other, the proposed architecture provides a system approach were each element requiring control may communicate with other controlled elements. In addition, a unique energy conversion switching technology is disclosed that processes AC or DC into optimized AC with desired electrical characteristics adaptable to suit a wide variety of electrical loading conditions.

According to one aspect of the disclosure, individual battery cells, or sets thereof, may include or have an associated energy converter. These converters may operate in concert with each other to improve charging characteristics of the energy storage system and to improve discharge characteristics for providing power to the load. Individual battery cells, or sets thereof, may work together to coordinate reconfiguration of the cells; however, an energy storage control system may manage operation and/or configuration of the battery cells, or sets thereof, as a group. A control system for the energy storage at all levels will be monitored and optimized for power balancing, fault management, charge optimization, as well as providing customized power to the load. This level of control is accomplished through use of an "adaptive" switching technology that is able to engage, disengage, and reconfigure various elements of the energy storage system. At least some aspects of the "adaptive" switching technology are described with respect to the solid-state electronic modules referenced in U.S. Pat. No. 8,878,373B2, which is incorporated by reference herein.

In addition to the system approach to control and optimization, the energy storage control and power conversion systems are optimized through use of multilevel control of the battery elements, and control regarding topologies for storage and provisioning of energy to and from battery cells. One application for the technology disclosed herein is an energy storage and delivery system tied to a large-scale power grid. However, the technologies disclosed herein are applicable to numerous other levels and applications of energy storage and provisioning, including, but not limited to, solutions for individual home or business energy storage and solutions for providing and storing energy for communities, coops, and neighborhoods.

In some solutions for battery management, the collective output of the battery is controlled to create the desired form of electrical energy for the load. In contrast, systems and methods herein control energy storage and provisioning down to the battery cell level or in groups of battery cells, depending upon the application. The system provides switching control and adjustment of output waveforms at various levels of the energy storage system, even down to the individual cells. This level of control over individual battery cells, or groupings of cells, provides significant advantages over conventional battery management systems.

Dynamic adjustment of the systems herein results in improved energy capture over a wider range of voltages compared to existing systems. The integrated switching and control system selects a topology configuration of battery cells, for example, to be in parallel or series, or to be engaged or disengaged, and as well providing switching and output control at various levels of the battery architecture. This allows for selection of the most desirable parts of the battery to be utilized which, in turn, allows the system to avoid charging cells with diminished charging or discharging characteristics. It also allows for balancing across battery components, and as well modifying energy conversion according to characteristics of the energy storage system and/or a connected load.

Rather using a single power converter to manage the collective output of the battery, the disclosed system uses switching elements so that multiple power converters are converting at their highest efficiency. For example, a single converter drawing only 10% of its capacity operates at a lower efficiency than a converter operating at its rated capacity. The disclosed multilevel conversion system ensures that the semiconductors employed in the process are the right capacity for the energy being processed and fed to the load. In other words, the energy storage system provides power to a converter that is the optimal size and configuration so as to better accommodate battery operations and efficiency, while providing an output which matches the requirements at the load.

The ability to provide switching control at various levels and/or cells of the energy storage system allows for the system to produce multiple outputs for applications that would benefit from such outputs and allows for the system to select particular cells to charge or discharge based on a condition of the cells or groups of cells, in light of other system conditions, including, for example, load requirements. As an example, a portion of the output from a particular cell or group of cells could be used to accommodate one load with a specific voltage, current, and frequency, while at the same time accommodating additional and alternate loads having different electrical requirements. Thus, the system operates at peak efficiency by using separate semiconductors sized to match the power being processed.

The system may include one or more DC-to-AC switching converters that modify characteristics of power provided from the battery cells, or groups thereof, while maintaining ideal conditions for the battery and power conversion system. As well, the system provides a unique capability for the system to balance both the DC Bus power with the power being drawn from the energy storage components. The control system obtains power from the power generator and/or energy storage system while improving performance of elements in the system. The energy storage system has capabilities that extend beyond existing technologies that use even the most advanced existing management systems for energy storage and/or provisioning. The multi-level control approach disclosed allows the individual cells, or groupings of cells, to act independently to provide power directly from whatever portion of the battery provides the most optimal output for the load. In some implementations, the system is capable of charging one portion of the battery (e.g., individual cells, group(s) of cells), while discharging another part of the same energy storage system. The control system determines inputs and/or outputs of various portions of the system according to conditions of battery cells of the energy storage system, while maintaining system balance and ensuring that high efficiency and power quality are maintained.

FIG. 1 shows a system 100 in which electrical power is generated and stored in a plurality of battery cells according to one or more implementations. The system 100 includes a mechanical energy source 102, a power generator 104, a power generator control system 106, an energy storage system 110, an energy storage control system 108, and a load 112. The mechanical energy source 102 includes a turbine or other rotational element that, as a result of being rotated, provides mechanical energy via corresponding rotation of a rotor or shaft to the power generator 104. The power generator 104 includes a stator generating electrical power as a result of the mechanical energy received from the energy source 102. Relative operation of the mechanical energy source 102 and the power generator 104 is described in U.S. Pat. No. 8,878,373, which is incorporated herein by reference in its entirety. As described in further detail, the power generator 104 includes a plurality of solid-state electronic modules that are operable to selectively output power wavelets collectively comprising a power output of the power generator 104. Although the power generator control system 106 and the energy system control system 108 are described and depicted as being distinct control systems, the power generator control system 106 and the energy system control system 108 may be part of a single control system in at least some implementations that controls the power generator 104 and energy storage system 110, as described herein.

The power generator control system 106 is communicatively and electrically coupled to the power generator 104 to control power output therefrom. In particular, the power generator control system 106 is electrically communicatively coupled to controllers of the solid-state electronic modules of the power generator 104 via an interface to control the wavelet output of the solid-state electronic modules. In at least some implementations, the power generator control system 106 may interact with the solid-state electronic modules to change a topology configuration of the solid-state electronic modules. The topology configuration refers to the relative arrangement of components of the solid-state electronic modules. In particular, the solid-state electronic modules each include a coil for interacting with magnetic flux generated by magnets of the rotor of the mechanical energy source 102. Switching elements, such as solid-state switches and relays, may be provided between coils of the solid-state electronic modules to control the configuration of one coil relative to another coil, or to control the configuration of a first set of coils relative to another set of coils. For example, the power generator control system 106 may cause a set of the coils to be connected in parallel with each other, or cause a set of the coils to be connected in series with each other.

Modifying the topology configuration changes the current and voltage characteristics of output wavelets generated by the solid-state electronic modules. As one example, a topology configuration in which the coils of the solid-state electronic modules are connected in a parallel relationship causes individual solid-state electronic modules to produce output wavelets having different voltage and current than a topology configuration in which the coils of the coils of the solid-state electronic modules are connected in a series relationship. This enables the power generator control system 106 to adjust the output of the power generator 104 to satisfy power requirements of the load 112 and/or charging characteristics of the energy storage system 110.

The power generator control system 106 may be electronically communicatively coupled to one or more sensors for determining operating characteristics, i.e., attributes, of the power generator 104. In at least some implementations, the generator control system 106 may be coupled to one or more angular sensors for determining a rotation angle of the rotor relative to the stator of the power generator 104. The power generator control system 106 may determine the speed of rotation of the rotor and determine the corresponding power output capability of the power generator 104. The power generator control system 106 may include a communication interface to communicate with external systems to determine expected conditions affecting power generation. For instance, the power generator control system 106 may obtain forecasted meteorological conditions (e.g., predicted wind speed, precipitation) that may affect the speed of rotation of the rotor and consequently a corresponding amount of power forecasted to be produced. The power generator control system 106 may adjust the topology configuration of the solid-state electronic modules according to the forecasted conditions.

The energy storage system 110 comprises a plurality of battery cells, and switches that are operable to selectively control the charging and discharging of individual battery cells or sets of battery cells. A switch may be associated with each battery cell in some implementations that is operable to selectively connect the battery cell with one or more terminals of other battery cells to organize sets of battery cells into a desired topology for charging or discharging the battery cells. Using the switches, the battery cells may be selectively engaged with or disengaged from each other, selectively engaged with or disengaged from input of the energy storage system 110, or selectively engaged with or disengaged from output of the energy storage system 110. In some implementations, the switches include one or more solid-state switches, such as MOSFETs, BJTs, thyristors (e.g., silicon controlled rectifiers), diodes, triodes, or the like. In some implementations, the switches may also include electromechanical switches, such as multi-throw switches, contactors, or relay switches.

The topology of a set of battery cells may be reconfigured to achieve the desired output voltage and/or output current based on charging and/or discharge characteristics of the battery cells. For example, a set of battery cells may be selectively arranged in parallel to achieve a desired current output, or a set of batteries may be selectively arranged in series to achieve a desired voltage output. As another example, a first set of battery cells may be arranged in parallel with each other, and a second set of battery cells may be arranged in parallel with each other and in series with the first set of battery cells to achieve a desired voltage and current output.

The control system 108 may determine a condition associated with each of the battery cells or with sets of the battery cells. The condition may be indicative of a charging capability of the cell—for instance, the rate at which the cell is currently capable of charging or with the charge capacity of the cell; or a discharging capability of the cell, such as the rate at which the cell is able to discharge or the capacity of the cell to discharge. The energy storage system 110 may include one or more monitoring systems that monitor the condition of each of the battery cells to determine their performance and/or health over time. For instance, the monitoring systems may monitor the battery cells to determine instances in which individual battery cells have been overcharged or undercharged, or instances in the battery cells have experienced potentially damaging conditions, such as temperatures exceeding recommended temperature ranges for the battery cells. The monitoring systems may communicate with the energy storage control system 108, which may obtain information related to the performance and/or health of the battery cells, and use the information in connection with how to determine topology configurations of the battery cells for charging or discharging. For instance, the energy storage control system 108 may store data related to the performance and/or health of the battery cells in memory of the control system 108, and prioritize charging or discharging of certain cells having better performance and/or health characteristics. Certain cells exhibiting lower quality health and/or performance may be disengaged from other battery cells and flagged for investigation, maintenance, or replacement. The monitoring systems may be connected with current, voltage, temperature, or other sensors, connected to the battery cells or terminals thereof for determining performance and/or health information thereof. For instance, the voltage measured across terminals of a battery cell may be compared with the current flow to and from the battery cell, and the voltage may be compared with an expected voltage measurement to determine the health of the battery cell.

The energy storage system 110 may further include one or more power conditioners that modify characteristics of power provided from the battery cells. For instance, the one or more power conditioners may convert direct current (DC) from a battery cell or set of battery cells into alternating current (AC) having a determined set of electrical characteristics based on loading conditions associated with the load 112. The electrical characteristics include current level, voltage level, and frequency of the alternating current produced.

The system 100 may include a converter subsystem 114 that selectively provides power from the power generator 104 or the energy storage system 110 to the load 112. The converter subsystem 114 may include a set of power converters that can convert DC provided from the energy storage system 110 into alternating current to be provided to the load 112. The converter subsystem 114 may also include a second set of converters to convert power supplied from the power generator 104 into a different form for provisioning to the load 112. The first and second sets of power converters of the converter subsystem 114 may operate in concert with one another to provide the desired output—for instance, the first set of power converters may convert DC from the energy storage system 110 into AC having a set of desired electrical characteristics (e.g., frequency, current level, voltage level, phase) and the second set of power converters may convert AC or DC from the power generator 104 into AC having the same set of desired electrical characteristics. The power converters may include a set of electronic switching components, as described in U.S. Pat. No. 8,878,373.

The converter subsystem 114 may be controlled by a control system in communication with the energy storage control system 108 and the power generator control system 106. The control system controlling the converter subsystem 114 may obtain information regarding power requirements of the load 112 or expected power requirements of the load 112 and interact with the energy storage control system 108 and the power generator 104 to determine how to satisfy the power requirements or expected power requirements. The control system controlling the converter subsystem 114 may be part of a control system that includes the power generator control system 106 and/or the energy storage control system 108. In such implementations, the larger control subsystem may be part of an integrated system that generates electrical power, stores electrical power (i.e., in the energy storage system 110), determines power requirements of the load 112, and interacts with the constituent parts of the system to optimize performance of the system.

Figure 2:
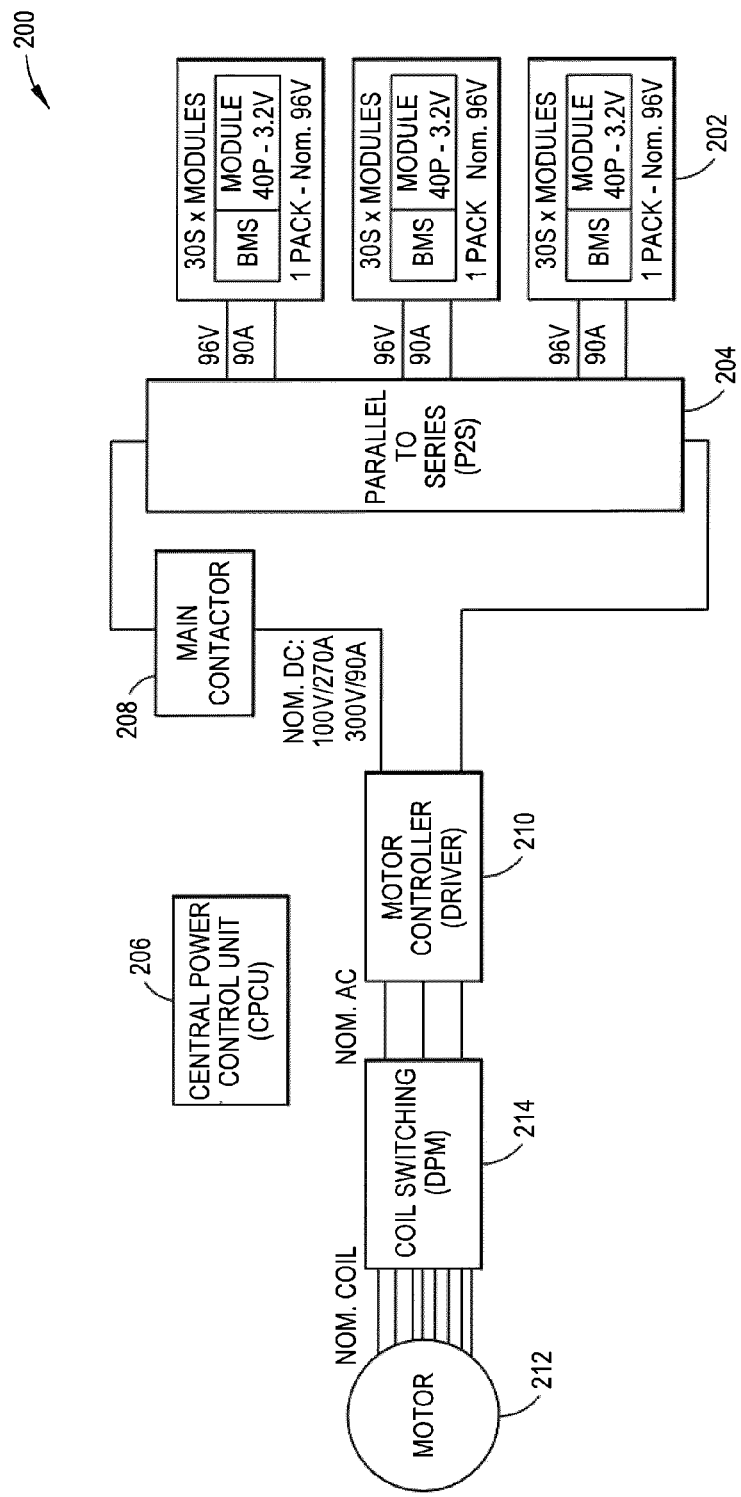
FIG. 2 depicts a system for controlling power provided to a motor by an energy storage and provisioning system, according to at least one disclosed implementation.

FIG. 2 shows a schematic diagram of a system 200 for controlling power provided to a motor according to one or more implementations. The system 200 includes one or more of the constituent parts comprising the system 100 described herein with respect to FIG. 1. The system 200 may be a power provisioning system of a car or other device, or even part of a residential or commercial power infrastructure. Although the system 200 is described and depicted as provisioning power to operate a motor, the system 200 may be implemented to provide power to a load, such as a set of residential or commercial buildings. The system 200 includes a plurality of battery packs 202 that each comprise one or more battery modules which, in turn, comprise a number of battery cells (e.g., 30 battery cells, in the example depicted). The battery packs 202 are part of the energy storage system 110 described herein.

Figure 3:
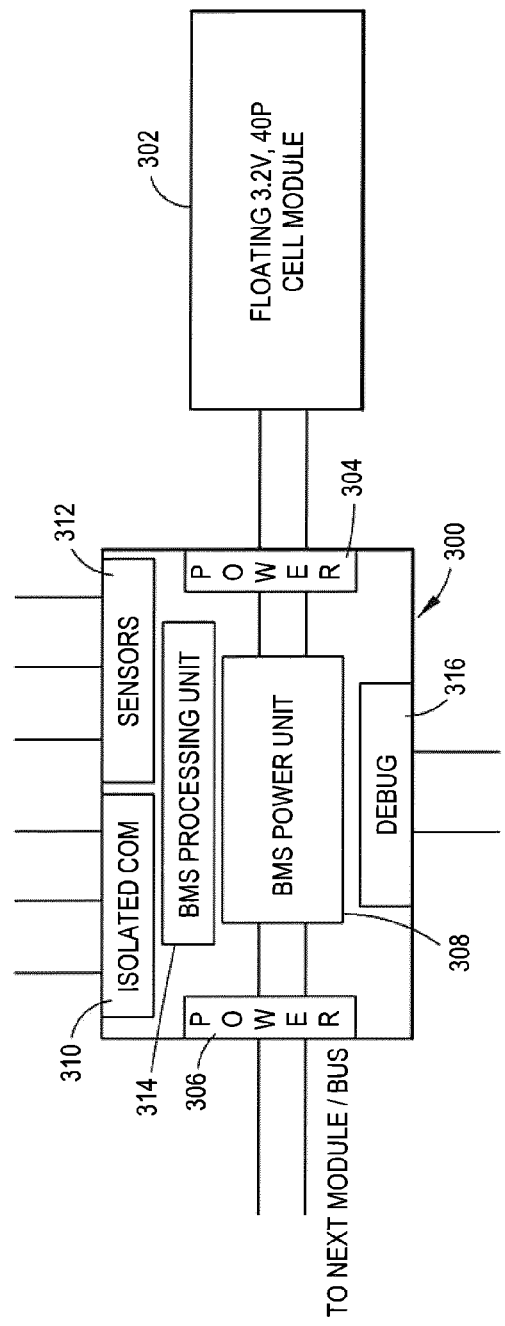
FIG. 3 depicts a battery management system that controls charging and discharging of battery cells of a battery module, according to at least one disclosed implementation.

As shown in FIG. 3, a battery module 302 may be associated with a battery management system 300 that controls charging and discharging of individual battery cells within the battery module 302. As noted above, a number of battery modules 302 may be combined to form a battery pack 202 (see FIG. 2). One or more battery cells may be under the control of each battery management system 300— for instance, thirty battery cells may be combined in a battery module 302 under the control of the battery management system 300 to produce a battery module output of up to 96 volts. In some implementations, the battery management system 300 may control whether individual battery cells 404 (see FIG. 4) are connected or disconnected for charging or discharging. The battery management system 300 may include a first interface 304 for interfacing with one or more battery modules 302 and a second interface 306 for interfacing with a topology switching subsystem 204 (see FIG. 2) described below. A power unit 308 may control the provisioning of power between the first interface 304 and the second interface 306. The power unit 308 may include a plurality of switching elements that are operable to control the flow of power between one or more interfaces of the first interface 304 and one or more interfaces of the second interface 306. Examples of switching elements of the power unit 308 include solid-state switches, such as metal oxide semiconductor field effect transistors (MOSFETs), bi-polar junction transistors (BJTs), diodes, and thyristors; and include electromechanical switches, such as relays. The switching elements may be operable to selectively control charging to, and discharging from, individual battery cells.

The battery management system 300 may further include a communication interface 310 for sending and receiving data, communications, control signals, etc., to and from other portions of the system 200. The communication interface 310 may be connected to a variety of operational networks and busses, including Control Area Networks (CAN), Precision Time Protocol (PTP) networks, Central Power Data (CPD) networks, and Central Power Synchronization (CPS) networks. The battery management system 300 may also include a sensor interface 312 that interfaces with one or more sensors associated with one or more of the battery cells in the battery modules 302 for obtaining measurements regarding a condition of the battery cells. The sensors may provide measurements regarding a voltage level, current input, current output, charge level, temperature, etc., of the associated battery cell or cells.

The battery management system 300 may further include one or more processors 314 for controlling operation of the battery management system 300, controlling charging/discharging of the battery cells and the power unit 308, sending and receiving communications over the communications interface 310, and receiving measurements from the sensor interface 312. The processor(s) 314 may take any one or more of a variety of forms, including but not limited to: one or more microcontrollers, microprocessors, field programmable gate arrays (FPGAs), application specific integrated circuits (ASICs), graphics processing units (GPUs), digital signal processors (DSPs), and/or programmed logic controllers (PLCs). The battery management system 300 may include one or more nontransitory computer- or processor-readable media, for instance memory (e.g., volatile memory, nonvolatile memory, random-access memory, read-only memory, Flash memory, solid state drive memory, spinning media storage such as magnetic disks, optical disks) storing instructions that, as a result of being executed, cause the battery management system 300 to perform the operations described herein. The memory may store a set of instructions causing the battery management system 300 to control charging, discharging, and connection of the battery cells of the battery modules 302 to other components for performance or protection-related purposes. The battery management system 300 may also perform operations according to communications, commands, control signals, etc., received from the CPCU 206.

The memory of the battery management system 300 may also store data regarding parameters of the battery management system 300, identification information regarding the battery management system 300 and/or battery cells of the battery modules 302, and information regarding conditions of the battery cells, such as information regarding voltage levels, current output/input, temperature, and capacity, by way of non-limiting example. Various information may be stored in association with time information useable to identify the time and/or date corresponding to recorded information. The stored instructions may also include instructions that cause the processing unit 314 to generate statistics and information representative of battery cell condition over time to determine the performance and health of the battery cells of the battery modules 302.

Referring again to FIG. 2, a topology switching subsystem 204 is also included in the system 200 for switching the battery pack 202 or battery cells thereof between different topology configurations, such as topologies in which the battery pack 202 are connected in parallel, series, or combinations of serial and parallel topologies. The topology switching subsystem 204 may transition between different topology configurations according to instructions, commands, or control signals received from a central power control unit 206 (CPCU) as described herein. The system 200 may include a main contactor 208 that includes one or more switching elements (e.g., electromechanical switches) that selectively connects or disconnects some or all of the battery packs 202 with other portions of the system 200.

A motor controller 210, such as a driver (e.g., adjustable speed driver), may be included in the system 200 to control various aspects of a motor 212 being powered by the battery pack 202. The motor controller 210 may be a processor-based system operable to convert DC power to AC power.

FIGS. 4A-4C depict a set of structures comprising a DC power supply, which may be used, e.g., for supplying DC power to a motor drive in a system for applying electromotive force to a load. FIG. 4A shows a battery module 402 comprised of a plurality of battery cells 404. The plurality of battery cells 404 in FIG. 4A are connected in parallel, but may be connected in series, or in a combination of series and parallel in some implementations. The module 402 is comprised of forty cells 404, but may comprise more or fewer in other implementations. FIG. 4B shows a plurality of battery modules 402 comprising a battery pack 406. The plurality of battery modules 402 are arranged in series in the battery pack 406, but may be arranged in parallel in some implementations. FIG. 4C shows a plurality of battery packs 406 connected to a switching matrix 402, such as, for example, a switching matrix comprising a plurality of solid-state switching elements to implement a coil topology configuration. The battery backs 406 may be selectively connected to be in series with each other as DC power input to the switching matrix 402, or in parallel with each other, or a combination of series and parallel.

Figure 5:
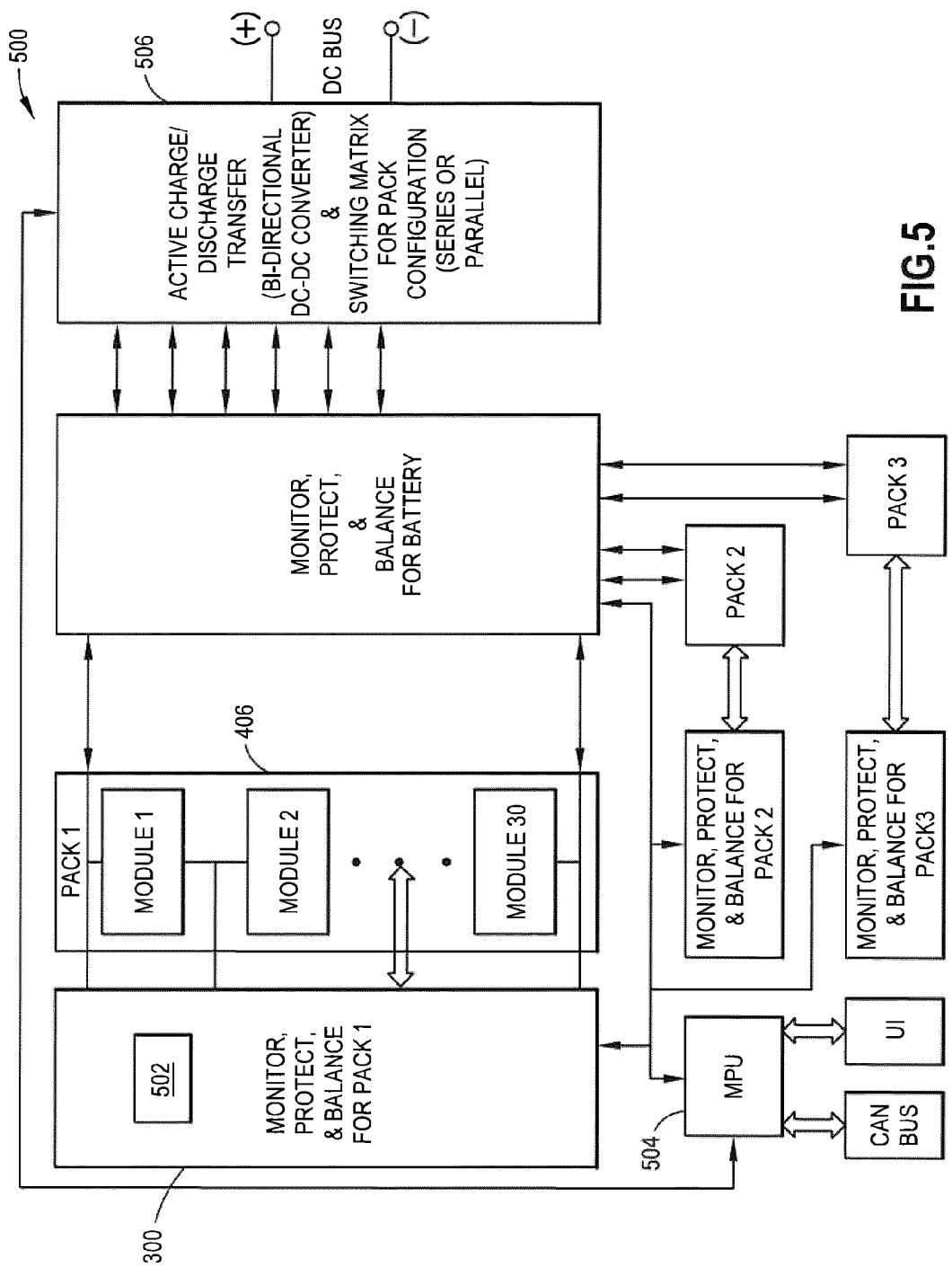
FIG. 5 shows a block diagram of an energy storage system using a number of battery management systems as components, according to at least one disclosed implementation.

FIG. 5 shows a block diagram of an energy storage system 500 using a number of battery management systems 300 as components, according to one or more implementations. Each battery pack 406 has a battery management system 300 comprising circuitry 502 to monitor, protect, and balance the battery modules 402 comprising the respective packs 406. The circuitry 502 may comprise components (e.g., analog, digital, processors) that process measurements from the sensors associated with the battery packs 406 and performs one or more operations as a result of the measurements. The circuitry 502 monitors the respective packs 406 to determine conditions associated therewith, including voltage level, current input, current output, temperature, etc. One or more sensors for detecting current, voltage, and/or temperature conditions may be coupled to the packs 406 and/or the modules 402 comprising the packs 406. Based on information obtained by monitoring the packs 406, the circuitry 502 may balance input to or output from the packs 406 or protect the packs 406 or associated components from potential damage. The circuitry 502 may also engage or disengage packs 406 or modules 402 thereof to protect or appropriately balance the battery packs. A microprocessor unit (MPU) 504 may be electrically communicatively coupled to each of the battery management systems 300, and which may control aspects of the battery management systems 300. The MPU 504 may communicate with other components in the system 200 via the CAN bus described herein, and may receive inputs via a user interface that provides information to users regarding the system 200 and receives user input. The energy storage system 500 also includes circuitry 506 for controlling charging and discharging of the battery packs 406, for controlling the switching of a switching matrix (such as the switching matrix 402 depicted in FIG. 4), and for controlling parallel/series connections of the battery packs 406, as described herein.

Figure 6:
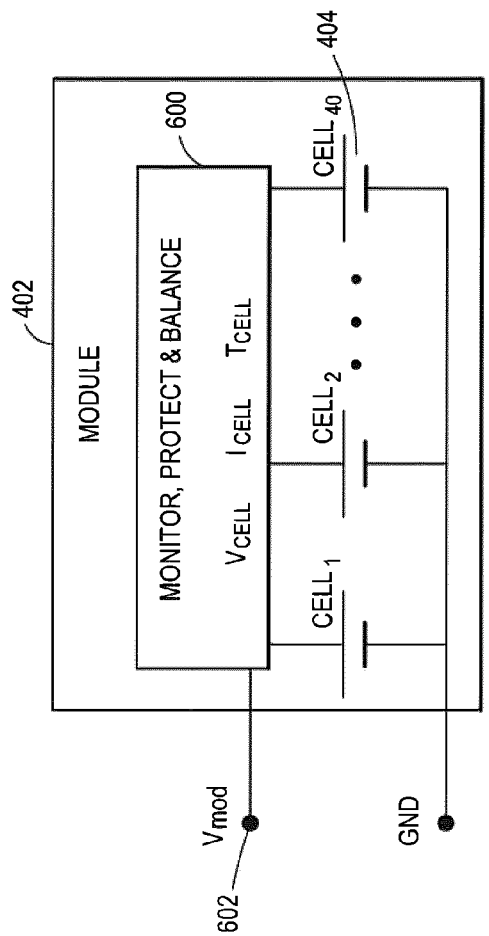
FIG. 6 shows a set of sensors coupled to the battery cells of a battery module to monitor the voltage, current input/output, and/or temperature of each battery cell or groups of cells.

FIG. 6 shows a set of sensors 600 coupled to the battery cells 404 of a battery module 402 to monitor the voltage of each battery cell 404 or groups of cells, current input/output of each battery cell 404 or groups of cells, and the temperature of each battery cell 404 or groups of cells. The set of sensors 600 provides output 602 representative of the measurements taken of the battery cells 404 to the corresponding battery management system 300. The battery management systems 300 may monitor conditions of the battery packs 406 down to the level of the battery cell 404. For instance, a set of sensors may be associated with one or more of the battery cells 404 comprising the battery modules 402.

Monitoring of the battery packs down to the battery cell 404 level enables the systems described herein to address battery performance and battery life. Although the parallel nature of a battery module 402 may ensure that the battery cells 404 in the module have the same voltage, this is not necessarily true for battery cell 404 impedance and current input/output. The disclosed battery management solutions enable balancing on the cell level to address this issue. Battery modules 402 and battery cells 404 may not heat up evenly, which can cause the battery cells 404 to have different impedances, and therefore contribute different currents. By balancing on the cell level, module level, and pack level, the systems described herein can provide the appropriate balance and protections for the battery structures. Each battery structure may contain thousands of cells, and each cell may be provided with a plurality of sensors to monitor the cell voltage (Vcell), cell impedance (Zcell), and cell temperature (Tcell), as described herein. The systems and operating methods described herein enable the batteries to be evenly balanced, such that the cells charge and discharge evenly by connecting and disconnecting cells/modules during charging/discharging events. Moreover, cells and/or modules having abnormal operating characteristics may be identified for maintenance or replacement. By balancing and protecting the batteries, the systems described herein may have improved efficiency in comparison with previously-implemented solutions.

The battery management systems 300 and/or MPU 504 may monitor and control aspects of the battery packs, modules, and cells based on various parameters, which may include minimum/maximum cell voltages, minimum/maximum charging and discharging currents, minimum/maximum cell temperature, minimum/maximum state of charge (SOC), minimum/maximum state of health (SOH), minimum/maximum charging rates, minimum/maximum discharging rates, and acceptable ranges of impedance for the battery cells.

The user interface of the energy storage system 500 may provide information to the user representative of various conditions, statuses, etc., of the system. Such information may include information representative of battery pack/module/cell voltage; battery pack/module/cell current battery pack/module/cell; SOC; depth of discharge (DOD); SOH; highest cell voltage; lowest cell voltage; average cell voltage; highest cell temperature; lowest cell temperature; average cell temperature; current module configuration; target voltage; modules/packs in series; modules/packs in parallel; system status; and any warnings indicating that a defined acceptable range of operation is exceeded. The MPU 504 may be configured to provide graphical representations showing charging over time, graphical representations showing discharging over time, graphical representations showing cell voltage over time (e.g., by cell, average, highest voltage, lowest voltage); power cycle count; power up time; input/output state.

The MPU 504 and/or battery management systems 300 may be configured to receive user input for defining acceptable operating ranges for the battery cells, modules, and/or packs. Such user input may define over voltage conditions; overshoot windows; cell target voltage; a charge complete window; a charger off window; charge regulating voltage; cell under voltage; cell end of life voltage; minimum charge temperature; maximum charge temperature; minimum discharge temperature; and/or maximum discharge temperature. The MPU 504 and/or battery management systems 300 may be further configured to receive user input for defining warning conditions that, as a result of being exceeded, cause presentation of a warning notification. Such warning conditions may be defined relative to minimum/maximum cell voltage; minimum/maximum cell temperature; maximum current input; maximum current output; acceptable impedance ranges for the cells; minimum/maximum cell battery management system supply voltage; minimum/maximum SOC; minimum/maximum ambient temperature.

Referring again to FIG. 2, the system 200 may be operated in an energy storage mode in which mechanical force is converted into electrical energy and stored in the battery packs 202. In such implementations, the motor controller 210 may include a plurality of solid-state electronic modules that are operable to convert output power of the motor 212 into DC output that can be used to charge the battery cells.

The technologies disclosed herein may be used, at least in part, as an electric drive train of a vehicle that can adapt to charge or discharge battery cells of the vehicle's battery system on the fly. Moreover, the system can reconfigure the topology configuration of the battery cells or coils associated with the motor to charge or discharge the battery cells according to a set of desired performance characteristics (e.g., torque, speed, efficiency). The technology disclosed herein can take raw output from a power generator and convert it directly into the desired AC output without having to go through the typical rectification process. This technology may also convert a portion of the output from the energy source while allowing another portion to be directed elsewhere. As an example, older wind turbines were designed as DFIG (doubly-fed wound rotor induction generators). These machines employed a feedback system that attempted to regulate and control the generator's output such that only a portion of the output would require power conditioning. The removal of some of the power electronics proved a strong value proposition and these machines captured considerable market share and became the most dominant megawatt-class turbine in the market.

Unfortunately for this DFIG technology, power grid requirements for power quality have continued to increase and the output from these DFIG machines has become less and less desirable due to poor power quality. While the removal of some of the power electronics is clearly advantageous, the power quality must be maintained. The proposed technology is capable of removing the costly rectification step while still allowing the power quality to meet even the highest grid requirements. Losses that would otherwise result from rectification are as well removed from the system providing increased system efficiency.

Existing power converters may be designed for a specific rating of the input voltage range and input current range rating, but if the input voltage or input current (and therefore power level) do not meet or exceed the levels for which the converter is designed, then the converter may not be capable of operation, or the converter may operate in an inefficient manner. For a multi-stage reconfigurable generator, a single power converter is unlikely to effectively accommodate the widely varying voltage and power range that is generated. Moreover, a single power transformer delivering power to the electrical load, connected to one or more converters, is unlikely to accommodate with reasonable efficiency the wide range of power that may be generated by a variable and reconfigurable generator. The described switching and control technology provides a means to engage only the specific number of semiconductors that are required to convert the available power at any given point in time. This ensures the highest efficiency and while one may make an analogy to a multi-level converter (which would serve to be a better solution than a single stage converter), is not as granular in control and capability as the disclosed technology which provides an ability to process variant and changing input electrical properties at peak efficiency due to both the innovative switching capabilities of the system, as well due to the converter's ability to properly size or configure itself based upon system conditions thereby producing optimal outputs of the highest efficiency and quality.

The control system is tasked with processing the collective system's feedback elements such that all relevant system components are monitored and provided directives for optimization. As a result, the energy storage system is maintained in its most optimal state, regardless of whether it is charging or discharging energy.

As an example, the operations for control may include (a) determining the fluid flow of available energy for the turbine and optimizing the turbine, (b) determining an optimal operating state for the reconfigurable multi-stage electrical generator and selecting the most optimal state; (c) determining and configuring the most optimal state of the rectification and charging system; (d) assessing the energy storage system's current operating state and optimizing for charging/discharging; and/or (e) assessing load requirements and providing optimal energy while maintaining all other systems in their most ideal operating conditions.

The DC to AC converter system can be described as a distributed self-governing system comprising a group of battery units that operate in coordination on several different levels. Together the individual units operate as a coordinated collective, combining their intake or output based on pre-programmed operational criteria.

When charging the system, it is seen as a load from the side of the grid, when discharging it is seen as a power producer. It provides grid storage, power quality optimization, and load balancing all in one system.

For a typical application using the disclosed technology, the first level of control is the individual battery cell. At this level, safety functions and optimization of the battery operation in charging, or power delivery mode, are managed. Each battery controls its own voltage, current, phase, temperature, etc. Each unit regulates input and output from 0 to 100% of its own capacity. Several connected units work as a coordinated group. The number of units in the group is dependent on the unit voltage in relation to the grid/load voltage.

Each unit controls its own input and output, and the groups of battery units work together in concert under the control of a control unit (e.g., CPCU 206). The grouped units can independently operate from full series to full parallel as needed.

The system capacity is limited to the combined charging/discharge rate of all the systems groups.

Changing battery operation from charging to power delivery is instant and determined by the control parameters. If excess power is available from the source, the system may not only provide power to the load, but as well it may allow for charging of the batteries at the same time.

The main control level is an adaptive evolved system that constantly monitors the condition of the grid. Where the load requirement is AC, the combined group of cells automatically forms to create a collective output to correctly match the desired electrical characteristics.

Different operational criteria can be applied to the system. For example, the system may maintain a specific charge level given system conditions.

In addition to complete control over duty cycle, which may be dynamically modified, other power characteristics are as well controllable. The adaptive switching control system can provide complete dynamic control of the phase, waveform, and amplitude characteristics of the output.

For grid applications, the main control level is tasked with maintaining ideal grid conditions and will independently decide what to do at any instant in time to optimize power to the load.

External control input can be added to preemptively counteract problems in closed power systems such as is seen on ships.

Control resolution is very fine due to the switching architecture providing capabilities beyond traditional inverter systems. Uneven phase loads, power spikes, noise, and other undesired transients can be suppressed and or improved provided the system is designed and dimensioned adequately.

The adaptive system is modular in design and can increase energy storage capacity, and balancing capability, as more units may be easily added.

The modularized energy storage system provides the added benefit of increased resilience. In larger systems having many battery units these units may be hot swapped in and out of the larger battery infrastructure providing ease of maintenance and system upgrades. Additional capacity can be added at any time by simply adding more units to the system.

Additional control functionality can be added to change the systems behavior, and further balance production and consumption. For instance, weather predictions could be added to the control code to increase or decrease storage percentages based on expected power consumption patterns. For renewable energy systems, the intelligent battery control system will monitor energy production from source(s) and be able to predict energy availability (wind, tidal, wave, etc.). The algorithm will as well gather data on consumption patterns and learn to predict energy demand cycles. As data is gathered on both available energy and consumption patterns, the algorithm will provide a more accurate and capable functionality as it controls how much energy to store and when and how it is released back to the load.

The system could decide to increase or decrease energy storage at appropriate times in order to balance the system, increase system capability in terms of the energy it can store and provide while reducing the demand on the system to the greatest degree possible. This means it will not store energy if it is not needed, but rather will maintain the optimal battery charge to ensure optimal system longevity.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

We claim:

1. A method of operation in an energy storage and provisioning system, the method comprising:
   causing two or more coils of at least one set of coils of a power generator to be connected to each other in a first configuration based at least in part on a charging characteristic of an energy storage system;
   receiving, in the energy storage system comprising energy storage cells, electrical power from the power generator, each of the energy storage cells comprising one or more switching elements selectively operable to connect with one or more terminals of other ones of the energy storage cells;
   determining, by a control subsystem comprising one or more processors and memory, a condition of a plurality of the energy storage cells via electrical measurement;
   grouping, by controlling operation of the one or more switching elements of the energy storage cells, a subset of the plurality of energy storage cells into a topology configuration based at least in part on a condition of individual cells of the subset of energy storage cells, the topology configuration corresponding to an interconnection relationship of the subset of energy storage cells; and storing the received electrical power into the subset of energy storage cells arranged into the topology configuration to optimize storage of the electrical power received from the power generator.

2. The method of claim 1 wherein the grouping of the subset of the plurality of energy storage cells into the topology configuration comprises causing a switching element of each of the energy storage cells to be connected to a terminal of another energy storage cell of the subset of the plurality of energy storage cells based at least on the topology configuration.

3. The method of claim 1 wherein the topology configuration is one of an electrically parallel interconnection of the subset of the plurality of energy storage cells or an electrically series interconnection of the subset of the plurality of energy storage cells.

4. The method of claim 1, further comprising:
receiving information regarding an attribute of the electrical power,
wherein the grouping of the subset of the plurality of energy storage cells into the topology configuration is based at least in part on the condition of individual cells of the subset of the plurality of energy storage cells and the attribute of the electrical power.

5. The method of claim 1 wherein the condition of each of the individual cells of the subset of energy storage cells is indicative of a rate at which a respective one of the individual cells is currently capable of charging or the charge capacity of the a respective one of the individual cells.

6. The method of claim 1 wherein the condition of each of the individual cells of the subset of energy storage cells is indicative of health of a respective one of the individual cells.

7. An energy storage and provisioning system, comprising:
an energy storage system comprising a plurality of energy storage cells, each of the energy storage cells comprising at least one switching element selectively operable to connect with one or more terminals of other ones of the energy storage cells, the energy storage system having one or more inputs for receiving power from an electrical power generator and one or more outputs for providing power to a load; and
a set of coil switching circuitry comprising a plurality of switching elements selectively operable to connect a number of coils of at least one set of coils of the electrical power generator into any of two or more topology configurations; and
a control subsystem comprising one or more processors and non-transitory memory storing a set of instructions that, as a result of execution by the one or more processors, cause the control subsystem to:
obtain information regarding an attribute of electrical power that is to be received at an input of the energy storage system or to be provided from an output of the energy storage system,
determine a topology configuration in which to arrange at least a subset of the plurality of the energy storage cells, the topology configuration determined based at least in part on the attribute of the electrical power,
cause the switching elements of the plurality of energy storage cells to be in respective switching states to form the determined topology configuration of the energy storage cells;
determine a topology configuration in which to arrange the coils of the at least one set of coils of the electrical power generator, the topology configuration determined based at least in part on a charging characteristic of the energy storage system, and
cause the switching elements of the set of coil switching circuitry to be in respective switching states to form the determined topology configuration of the coils of the at least one set of coils of the electrical power generator.

8. The energy storage and provisioning system of claim 7 wherein the topology configuration is one of a parallel interconnection of the subset of the plurality of energy storage cells or a series interconnection of the subset of the plurality of energy storage cells.

9. The energy storage and provisioning system of claim 7 wherein the set of instructions further causes the control subsystem to determine a condition of each of the plurality of energy storage cells, the condition being based at least in part on measured electrical characteristics of the respective energy storage cell, wherein determining the topology configuration is based at least in part on the condition of each of the plurality of energy storage cells.

10. The energy storage and provisioning system of claim 7, further comprising a power converter connected to at least the subset of the plurality of energy storage cells and an output of a power generator, wherein, in operation, the power converter converts a direct current output from the subset of the energy storage cells into an alternating current output having a specified set of electrical characteristics, and converts the output of the power generator into the alternating current output having the specified set of electrical characteristics.

11. The energy storage and provisioning system of claim 10 wherein the power generator comprises a stator including the plurality of coils and a plurality of electronic modules that generate wavelets in response to interaction of an electromagnetic field with one or more of the plurality of coils, the output of the power generator corresponding to the wavelets generated.

12. The energy storage and provisioning system of claim 7 wherein the control subsystem comprises an energy storage and a coil switching control subsystem.

13. The energy storage and provisioning system of claim 7 wherein the energy storage system has one or more inputs for receiving power from at least one of an electrical grid or a rotating electric machine operating as the electrical power generator.

14. The energy storage and provisioning system of claim 7 wherein the plurality of switching elements of the set of coil switching circuitry are selectively operable to connect the coils of the at least one set of coils of the electrical power generator into a series topology configuration of the coils.

15. The energy storage and provisioning system of claim 7 wherein the plurality of switching elements of the set of coil switching circuitry are selectively operable to connect the coils of the at least one set of coils of the electrical power generator into a parallel topology configuration of the coils.

16. The energy storage and provisioning system of claim 7 wherein the plurality of switching elements of the set of coil switching circuitry are selectively operable to connect the coils of the at least one set of coils of the electrical power generator into a series topology configuration of the coils, into a parallel topology configuration of the coils, and into a combination of a series and a parallel topology.

17. A method to control a power system comprising battery cells, the power system charging and discharging the battery cells, the method comprising:
   determining, by a control subsystem comprising one or more processors and memory, charging characteristics of at least some of the battery cells via electrical measurement;
   determining, by the control system, one or more attributes of electrical power received from an electric power generator;
   causing at least a first subset of the battery cells to be connected to each other in a first configuration based at least in part on the charging characteristics of the first subset of the battery cells and the one or more attributes of the electrical power received;
   causing two or more coils of at least one set of coils of the electrical power generator to be connected to each other in a first configuration based at least in part on a charging characteristic of the energy storage system; and
   providing the received electric power to the first subset of the battery cells.

18. The method of claim 17, further comprising:
   determining a power requirement of a load electrically coupled to the power system;
   determining a discharge characteristic of at least some of the battery cells;
   causing at least a second subset of the battery cells to be connected to each other in a second configuration based at least on the discharge characteristics of the second subset of the battery cells and the power requirement of the load; and
   discharging electric power stored by the second subset of the battery cells to the load.

19. The method of claim 17 wherein determining, by a control subsystem comprising one or more processors and memory, a condition of a plurality of the energy storage cells via electrical measurement.

* * * * *